(12) United States Patent
Nishino et al.

(10) Patent No.: US 6,411,597 B1
(45) Date of Patent: Jun. 25, 2002

(54) DISC CARTRIDGE

(75) Inventors: Yukio Nishino, Nara; Yoshikazu Goto, Hirakata, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 33 days.

(21) Appl. No.: 09/585,750

(22) Filed: Jun. 2, 2000

(30) Foreign Application Priority Data

Jun. 4, 1999 (JP) ............................................ 11-157898
Jun. 14, 1999 (JP) ............................................ 11-166378

(51) Int. Cl.⁷ .............................................. G11B 23/03
(52) U.S. Cl. ....................................................... 369/291
(58) Field of Search ........................................... 369/291

(56) References Cited

U.S. PATENT DOCUMENTS

| | | | | |
|---|---|---|---|---|
| 4,455,642 A | * | 6/1984 | Inaba ........................... | 369/291 |
| 4,755,982 A | * | 7/1988 | Douwes ....................... | 369/291 |
| 4,849,958 A | * | 7/1989 | Douwes et al. ............. | 369/77.2 |
| 5,748,609 A | * | 5/1998 | Tanaka ........................ | 369/291 |
| 6,052,359 A | * | 4/2000 | Fujiura ........................ | 369/291 |
| 6,172,962 B1 | * | 1/2001 | Goto et al. .................. | 369/291 |
| 6,205,114 B1 | * | 3/2001 | Takekoh et al. ............. | 369/291 |
| 6,205,115 B1 | * | 3/2001 | Ikebe et al. ................. | 369/291 |

FOREIGN PATENT DOCUMENTS

JP          11-86487        3/1999

OTHER PUBLICATIONS

U.S. Patent application Ser. No. 09/269,352.
U.S. Patent application Ser. No. 09/373,465.
U.S. Patent application Ser. No. 09/373,290.
U.S. Patent application Publication 2001/0014080 A1 (Lim et al.) Aug.–2001.*

* cited by examiner

Primary Examiner—William Klimowicz
(74) Attorney, Agent, or Firm—Akin, Gump, Strauss, Hauer & Feld, L.L.P.

(57) ABSTRACT

A disc cartridge in accordance with the present invention includes a disc holder for supporting a disc-shaped recording medium and a case defining a housing portion for receiving the disc holder and the recording medium. The case further includes a top portion, a bottom portion, and side portions surrounding the housing portion, the case allowing the disc holder to be inserted into and removed from the housing portion via an opening formed through the side portions. The disc holder includes a grip used for grasping the disc holder. Cuts are formed on the top and bottom portions of the case for exposing the grip when the disc holder is in the case. The grip engages the cuts to prevent the case from deforming outwardly when the disc holder is inserted into the case.

12 Claims, 26 Drawing Sheets

DISC CARTRIDGE

BACKGROUND OF THE INVENTION

The present invention relates generally to a disc cartridge housing a disc-shaped recording medium, and more particularly to a disc cartridge that permits a disc-shaped recording medium to be mounted therein and removed therefrom by a disc holder or holding the recording medium.

With widespread use of disc-shaped recording media (hereinafter, simply referred to as "discs") for recording various types of information, disc cartridges for housing such discs therein are now under development. A disc cartridge houses a disc in a rotatable state, and such a disc-housing cartridge is mounted in a recording/reproducing apparatus for use. Such disc cartridges are classified into two types: a type that allows for mounting/removal of a disc (disc-removable type) and a type that does not allow for mounting/removal of a disc.

A disc-removable type disc cartridge is disclosed in Japanese Laid-Open Patent Publication No. 11-86487. This conventional disc cartridge includes a case that houses a disc rotatably and a lid for opening/closing a disc insertion opening of the case. The lid is provided with a disc support member that elastically deforms in the plane parallel with the disc surface for supporting the disc. Once the lid is mounted in the case, the disc support member elastically deforms to permit rotation of the disc. Insertion and removal of the disc into and out of the case are done by an operator who grasps the lid.

The above-described conventional disc cartridge has the following problems. When the operator grasps the lid to pull it out of the case, he or she is likely to touch the disc possibly leaving a fingerprint and the like on the disc. If the disc is contaminated, the reliability of recording/reproduction is reduced.

The disc support member is kept elastically deformed as long as the lid is mounted in the case. Therefore, if the lid is kept mounted in the case for a prolonged period of time, stress relaxation of the disc support member may occur, resulting in a reduction of the disc holding capability of the disc support member. With a reduced disc holding capability, the disc may slip off when the lid is pulled out of the case. In order to avoid this problem, the disc support member must be made of a material having a low stress relaxation such as phosphor bronze, for example. This results in failure of integral molding of the disc support member with the lid body using, for example, a polymeric material, and thus increases the cost of the disc support member.

The present invention provides a disc cartridge that exhibits good operability when a disc holder is pulled out of or pushed into a case and reduces the possibility of a finger touching the disc.

SUMMARY OF THE INVENTION

The disc cartridge of the present invention includes a disc holder for supporting a disc-shaped recording medium and a case including a housing portion for receiving the disc holder and the recording medium. The case further includes an upper portion, a lower portion, and side portions surrounding the housing portion, the case allowing the disc holder to be inserted into and removed from the housing portion via an opening formed through the side portions. The disc holder also includes a grip used for grasping the disc holder. The upper and lower portions of the case include cuts for exposing the grip when the disc holder is in the case. The grip engages the cuts to prevent the case from deforming outwardly when the disc holder is inserted into the case.

The disc cartridge of another embodiment of the present invention includes: a disc holder for supporting a disc-shaped recording medium; and a case defining a housing portion for receiving the disc holder and the recording medium. The case includes an upper portion, a lower portion, and side portions surrounding the housing portion, the case allowing the disc holder to be inserted into and removed from the housing portion via an opening formed through the side portions. One of the upper and lower cases has a first protrusion for stopping insertion movement of the disc holder. The other of the upper and lower cases has a second protrusion for stopping removal movement of the disc holder. The disc holder includes: at least one finger-shaped flexible member that extends from a side face of the disc holder and bends in the plane substantially parallel with a top surface and a bottom surface of the disc holder. The disc holder further includes a lock member that engages with the first protrusion and the second protrusion of the case. The lock member is formed on a side face of the flexible member, and is moved to a position free from the limitation of the second protrusion of the case by deforming the flexible member, so as to allow the disc holder to move.

BRIEF DESCRIPTION OF THE SEVERAL VIEWS OF THE DRAWINGS

The foregoing summary as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Hereinafter, preferred embodiments of the disc cartridge of the present invention will be described with reference to the accompanying drawings.

Figure 1:
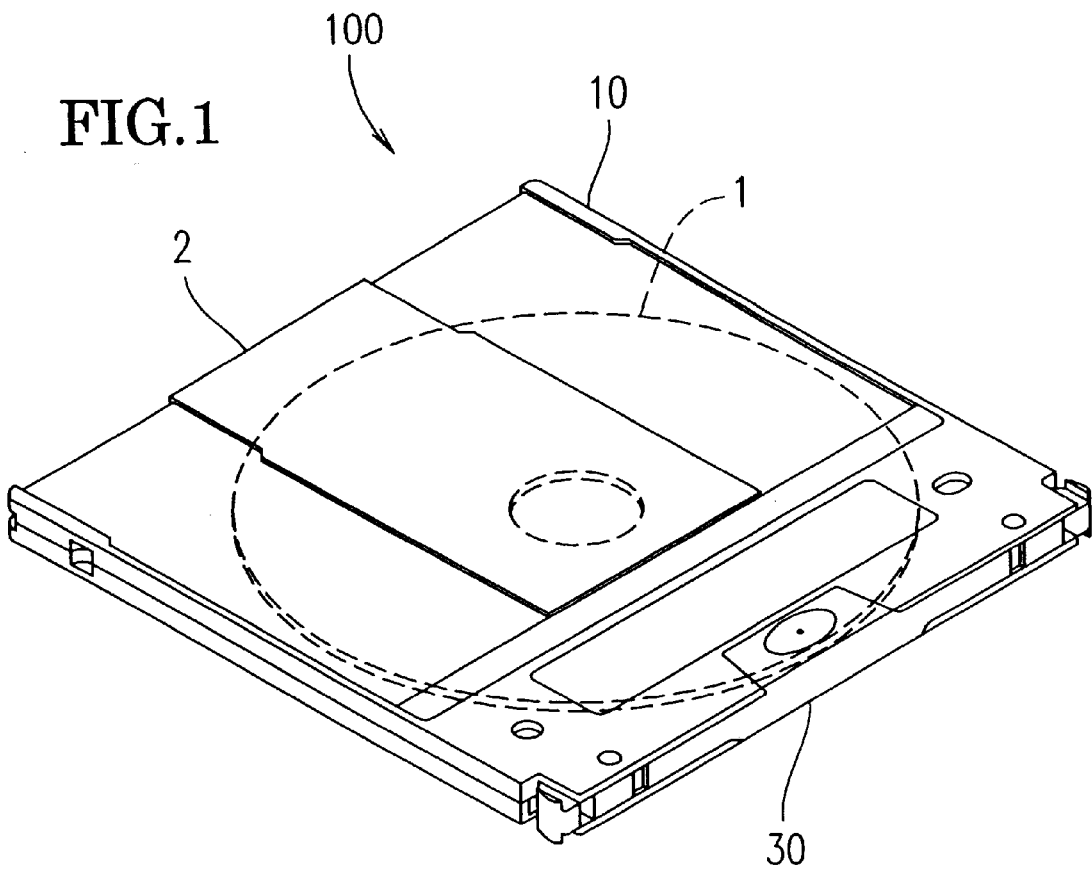
FIG. 1 is a schematic perspective view of a disc cartridge of an embodiment of the present invention.

First, referring to FIGS. 1 to 3, a disc cartridge 100 of an embodiment of the present invention will be described.

The disc cartridge 100 of this embodiment includes a case body 10 capable of housing a disc 1 and a disc holder 30 capable of holding the disc 1 when the disc 1 is loaded or unloaded via an insertion opening of the case body 10. A shutter 2 is slidably attached to the case body 10 for opening/closing access openings of upper and lower parts of the case body 10. FIG. 1 shows the disc holder 30 having the disc 1 placed therein completely inserted into the case body 10. FIG. 2 shows the disc holder 30 having the disc 1 placed and therein inserted halfway into the case body 10.

Once the disc cartridge 100 with the above construction is mounted in a recording/reproducing apparatus (not shown), the shutter 2 is slid open to allow a head (not shown) to execute reading, recording, reproduction, and/or erasing of information from/to the disc 1 housed in the disc cartridge 100.

Figure 3:
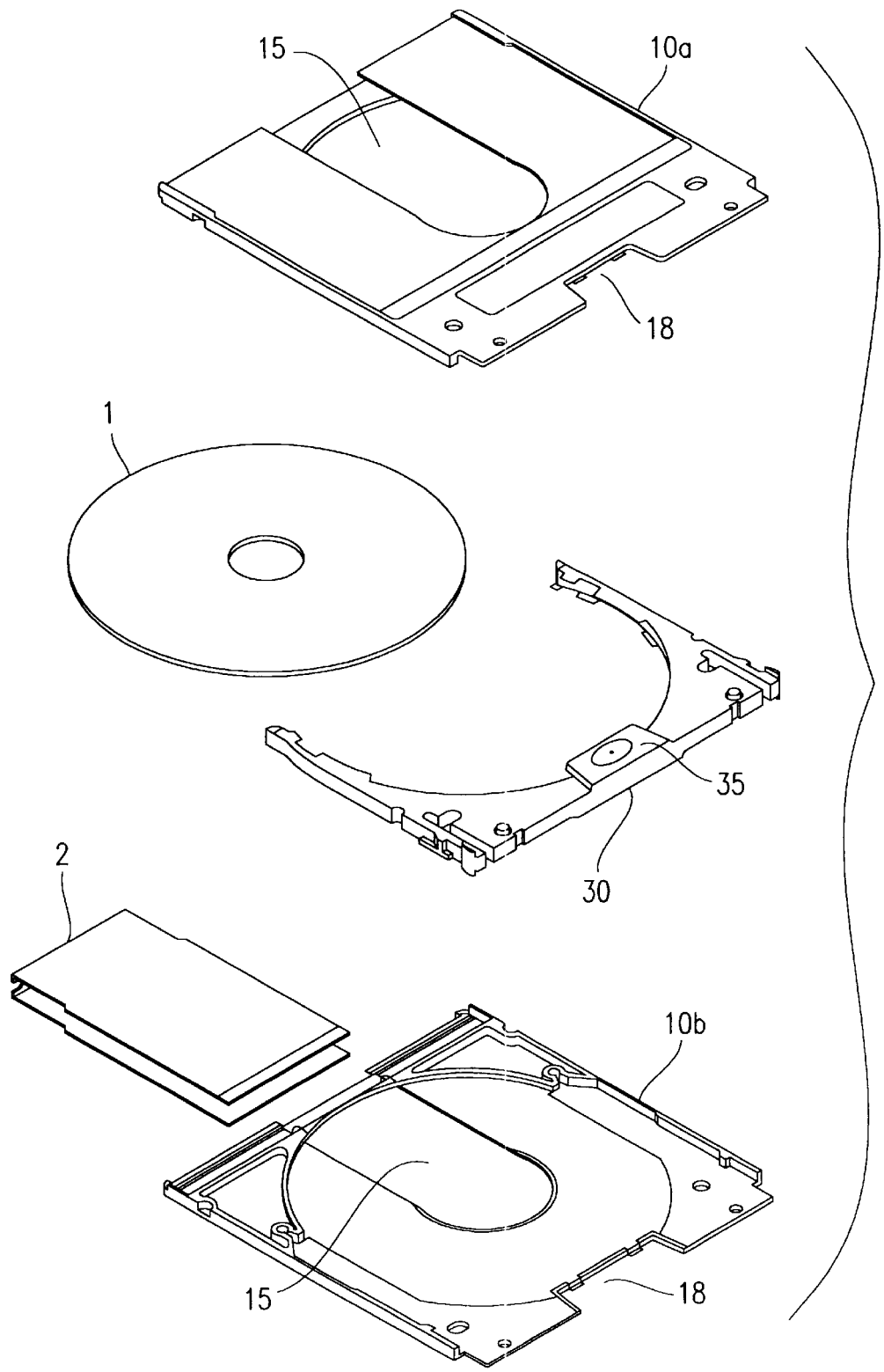
FIG. 3 is an exploded perspective view illustrating the construction of the disc cartridge of FIG. 1.

The disc 1 is a disc-shaped recording medium having a hole in the center as shown in FIG. 3 and has a recording layer (not shown) for recording information. Any type of disc may be used for the disc cartridge 100, including, but not limited to, phase-change type optical disc and a magnetic disc.

The disc 1 may be directly inserted into the case body 10. Preferably, however, the disc 1 is first placed in the disc holder 30 shown in the middle of FIG. 3, and then the disc holder 30 holding the disc 1 is inserted into the case body 10. The placement of the disc 1 in the disc holder 30 will be described hereinafter with reference to FIG. 9.

Figure 2:
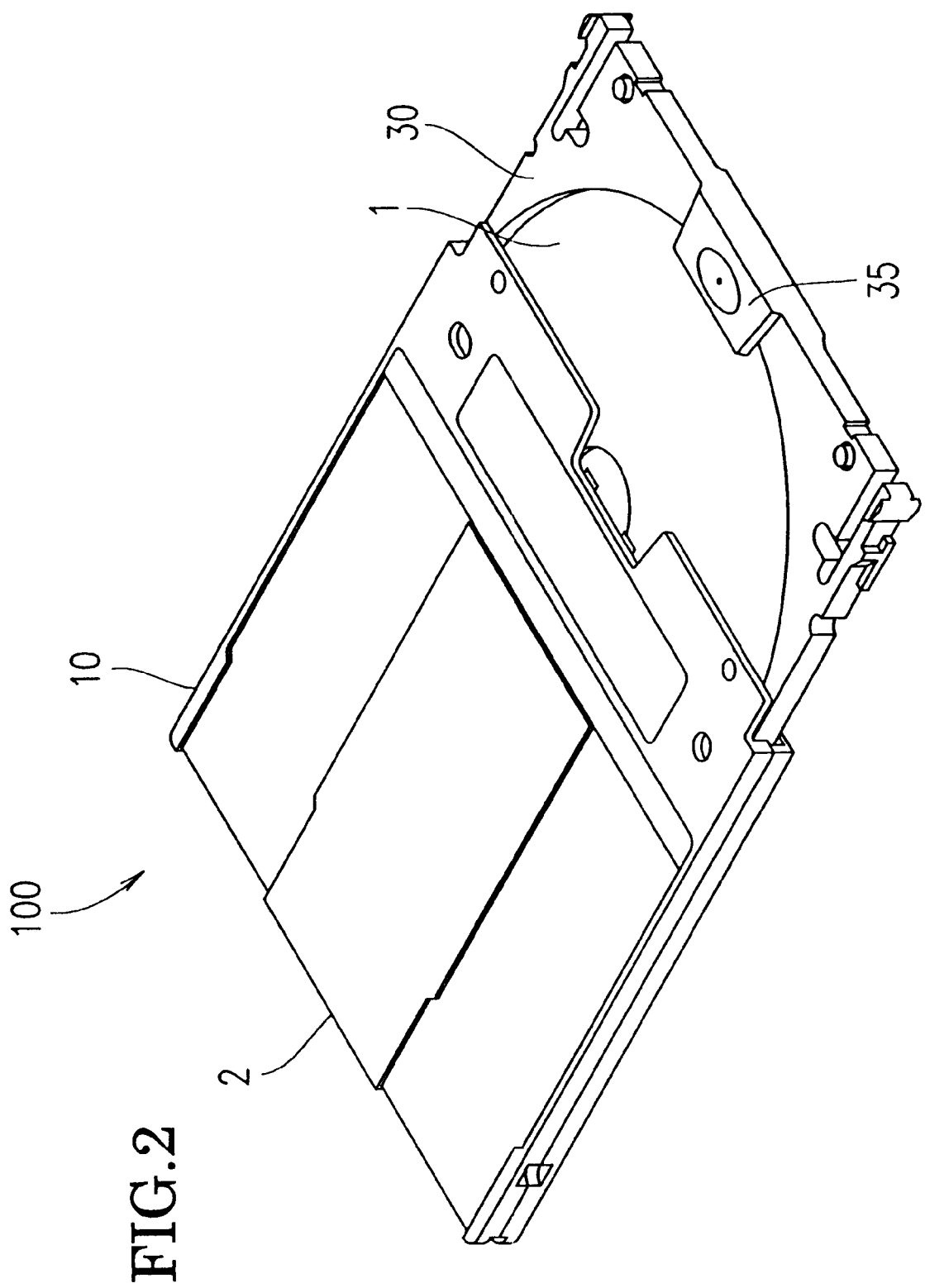
FIG. 2 is a perspective view illustrating the disc cartridge of FIG. 1 in which a disc holder is inserted halfway.

As shown in FIG. 2, the disc holder 30 is inserted into or removed from a disc housing portion of the case body 10 via the insertion opening (elongate opening with a large width and a small height). The disc holder 30 is provided with a, grip 35 that is shaped and sized to allow for easy grasp with human fingers (for example, with a thumb and an index finger). By grasping the grip 35 of the disc holder 30, a use can insert the disc 1 into the case body 10 without touching the disc 1.

The case body 10 is essentially composed of an upper case 10a and a lower case 10b as shown in FIG. 3. The upper case 10a and the lower case 10b have respective access openings shaped to allow for the exposure of part of the top and bottom surfaces of the disc 1, as well as the center hole thereof. The access openings are opened/closed as the shutter 2 slides. The shutter 2 is attached to the case body 10 over an end portion of the case body 10 so as to be slidable along the end face. As used herein, the end portion of the case body 10 where the shutter 2 is attached is referred to as the "front end portion", whereas the opposite end portion of the case body 10 is referred to as the "rear end portion". The other two end portions of the case body 10 are referred to herein as the "side end portions".

Cuts 18 are formed on the rear end portions of the upper and lower cases 10a and 10b as shown in FIG. 3. The shape and position of the cuts 18 are designed so that the grip 35 of the disc holder 30 is exposed when the disc holder 30 is mounted in the case body 10. With this configuration, the grip 35 of the disc holder 30 can be grasped with a finger and a thumb even when the disc holder 30 is mounted in the case body 10 (FIG. 1). As a result, the operation of inserting and removing the disc holder 30 into and from the case body 10 can be easily done by grasping the grip 35 with a finger and a thumb.

In the disc cartridge 100 of this embodiment, the grip 35 is prevented from overlapping with the peripheries of the cuts 18 of the case body 10, to prevent the peripheries of the cuts 18 from deforming outwardly, when the disc holder 30 is forcibly pushed into the case body 10. At least one of the grip 35 of the disc holder 30 and the cuts 18 of the case body 10 has a case deformation protection structure for protecting the case body 10 from moving in the direction vertical to the top or bottom surface of the grip 35. This structure will be described hereinafter in detail. Without such a deformation protection structure, when the disc holder 30 is forcibly inserted into the case body 10, the disc holder 30 could enter the case body 10 too deeply, causing the grip 35 to underlie the peripheries of the cuts 18 of the case body 10 thereby forming steps between the peripheries of the cuts 18 and the surfaces of the grip 35.

Figure 4:
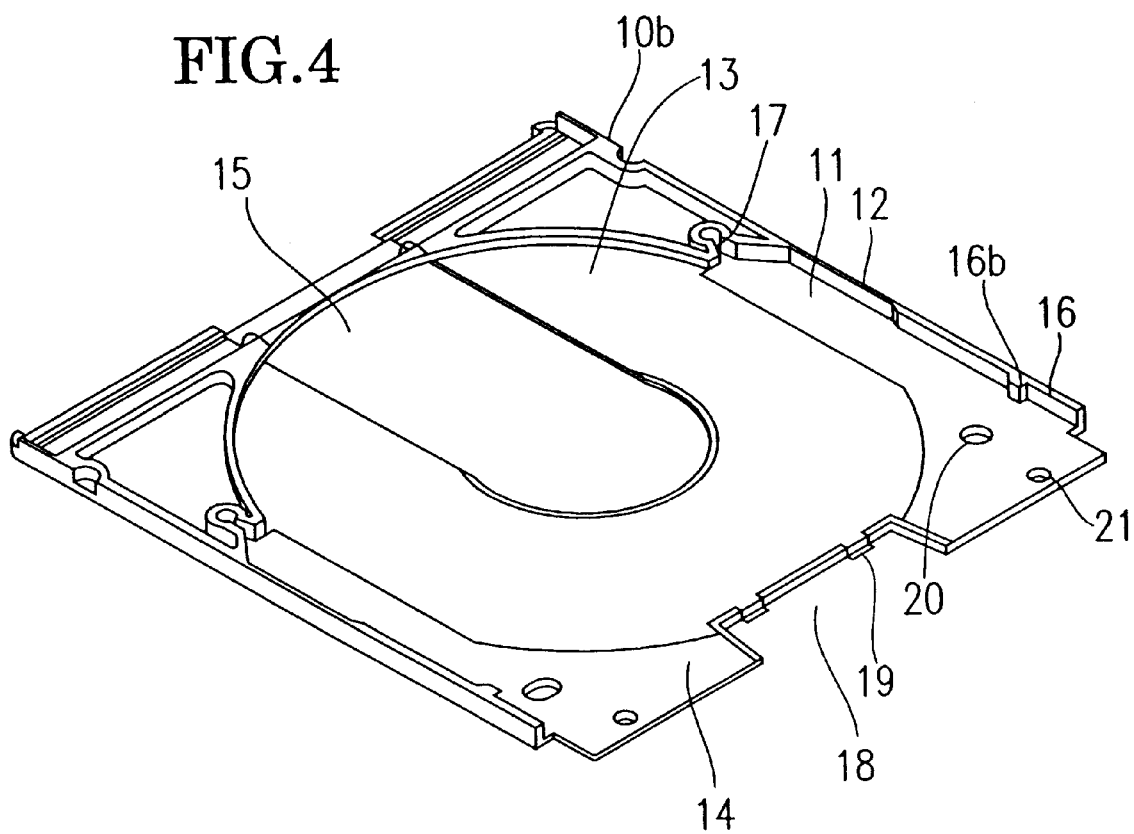
FIG. 4 is a perspective view of a lower case of the disc cartridge FIG. 1.
Figure 5:
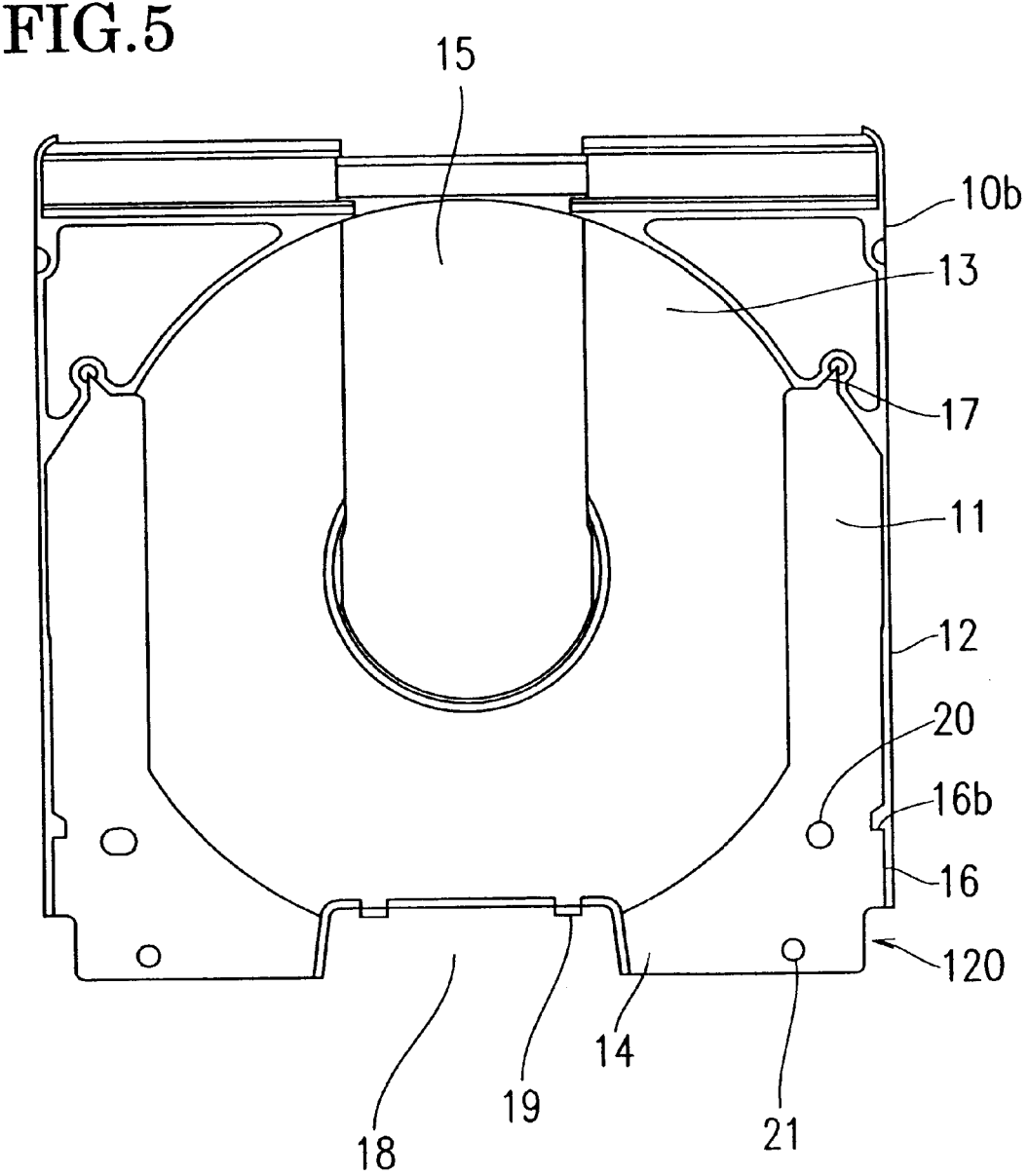
FIG. 5 is a top plan view of the inner surface of the lower case of the disc cartridge of FIG. 1.
Figure 6:
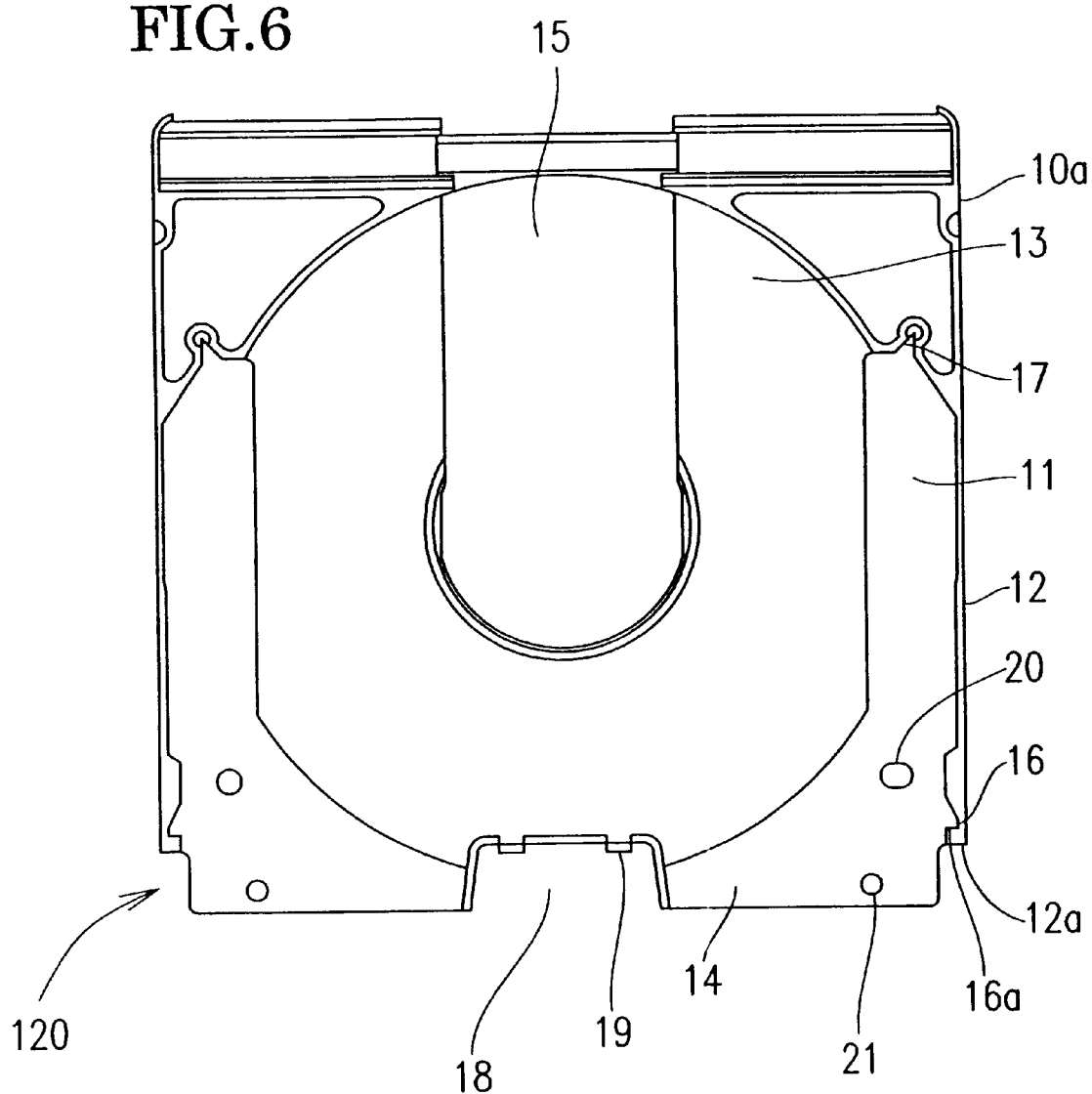
FIG. 6 is a bottom plan view of the inner surface of an upper case of the disc cartridge of FIG. 1.

Referring to FIGS. 4 to 6, the structure of the case body 10 will be described in more detail.

The case body 10 is formed by bonding together the upper and lower cases 10a and 10b by ultrasonic deposition or the like. The upper and lower cases 10a and 10b have similar shapes and sizes and are preferably made by molding a resin or other polymeric material such as polycarbonate.

As shown in FIGS. 4 and 5, the lower case 10b includes a thin-plate main wall 11 (thickness: about 0.8 mm) that faces the bottom surface of the disc 1 and side walls 12

(thickness: about 1.0 mm) extending from the side edges of the main wall 11 in the direction perpendicular to the main wall 11. Part of the main wall 11 constitutes a curved rib to face part of the perimeter of the disc 1 when the disc 1 is placed in position. Near both ends of the rib are formed mating walls 17 for receiving top ends of arms 32 (FIG. 7) of the disc holder 30 when the disc holder 30 is inserted into the case body 10. The mating walls 17 mate with the top ends of the arms 32 to secure the positions of the arms 32 of the disc holder 30.

The cut 18 is formed in the center of the rear end portion of the lower case 10b for receiving the grip 35 of the disc holder 30. Stop lugs 19 are formed at the cut 18 for engaging with stop recesses 37 (FIG. 10) formed on the grip 35.

As most clearly shown in FIG. 5, each of the side walls 12 includes a stop portion 16 having an insertion stop wall 16b protruding toward a housing portion 13. The insertion stop wall 16b abuts against an insertion limit wall 41b of a lock 41 of the disc holder 30 shown in FIG. 7 when the disc holder 30 is inserted into the case body 10. The role of the insertion limit wall 41b will be described hereinafter.

As shown in FIGS. 4 and 5, an access opening 15 of the lower case 10b is a relatively large cut formed in the front end portion of the main wall 11, extending from the center to the front end of the lower case 10b. Through the access opening 15, a head enters the inside of the case body 10 for executing reading, recording, reproducing, and erasing of information for the disc 1. A disk motor for rotating the disc 1 also enters the inside of the case body 10 through the access opening 15. The access opening 15 is normally covered with the shutter 2 to protect the inside of the case body 10 from the intrusion of dust and the like.

Referring to FIG. 6, the upper case 10a has a structure similar to that of the lower case 10b. The upper and lower cases 10a and 10b are combined together to assemble the case body 10 in the following manner. The side walls 12 and the rib of the upper case 10a and those of the lower case 10b are aligned with each other and bonded together, so that the two main walls 11 face each other with a predetermined space therebetween. In this way, the housing portion 13 for rotatably housing the disc 1 is defined by the main walls 11, the side walls 12, and the ribs.

An insertion opening 14 for allowing insertion/removal of the disc holder 30 is formed at the rear end of the case body 10 and communicates with the housing portion 13. As shown in FIG. 1, the insertion opening 14 is blocked with the disc holder 30 once the disc holder 13 has been completely inserted into the case body 10. The disc holder 30 thus serves as a lid or cover member for covering the insertion opening 14 of the case body 10. It should be noted that the case body 10 is configured to expose top ends of a pair of flexible fingers 40 (FIG. 7) of the disc holder 30 when the disc holder 30 is fully inserted into the case body 10. Therefore, both corners of the rear end portion of each of the upper and lower cases 10a and 10b constitute corner cuts 120 as shown in FIGS. 5 and 6 for accommodating the flexible fingers 40.

Referring to FIG. 6, each of the side walls 12 of the upper case 10a also includes a stop portion 16 that engages with the lock 41 (FIG. 7) of the disc holder 30. In this embodiment, however, the shape of the stop portion 16 of the upper case 10a is different from that of the lower case 10b. More specifically, while the stop portion 16 of the lower case 10b includes the insertion stop wall 16b, the stop portion 16 of the upper case 10a includes an escape stop wall 16a. The functions of the escape stop wall 16a and the insertion stop wall 16b will be described hereinafter.

An alignment hole 20 is formed through each of the upper and lower cases 10a and 10b for aligning the disc cartridge 100 with respect to a disc drive when the disc cartridge 100 is mounted in the disc disc drive (not shown). The alignment hole 20 receives an alignment pin (not shown) in the disc drive to thereby determine the position of the disc cartridge 100.

A disc removal identifying hole 21 is also formed through each of the upper and lower cases 10a and 10b. The disc removal identifying hole 21 receives a disc removal identifier 43 (FIG. 7) of the disc holder 30. The function of the hole 21 will be described hereinafter.

Next, the construction of the disc holder 30 will be described in detail with reference to FIGS. 7 to 11.

Figure 7:
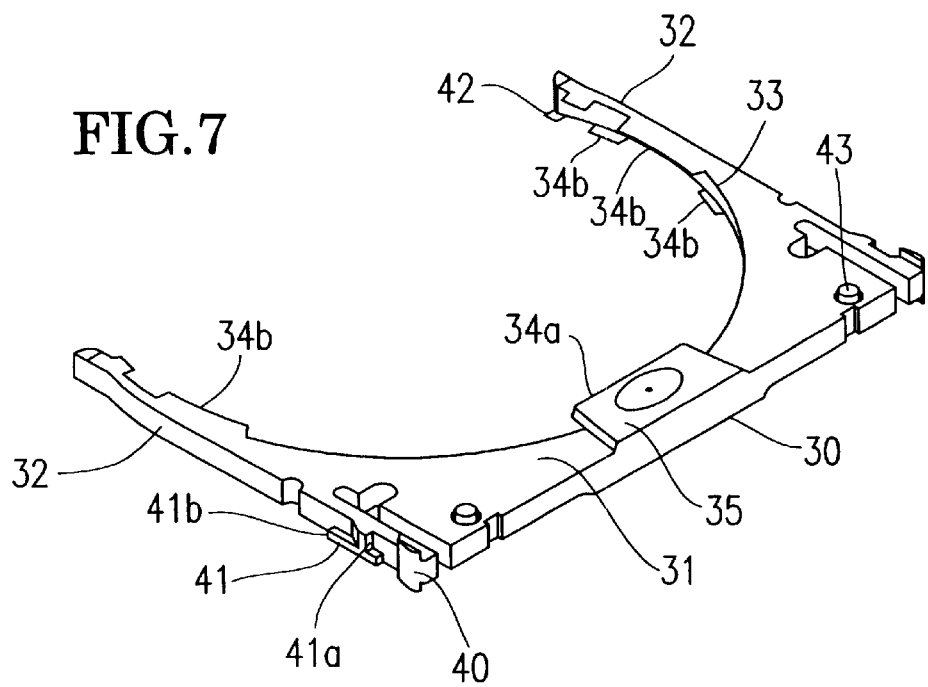
FIG. 7 is a perspective view of the disc holder of the disc cartridge of FIG. 1.
Figure 8:
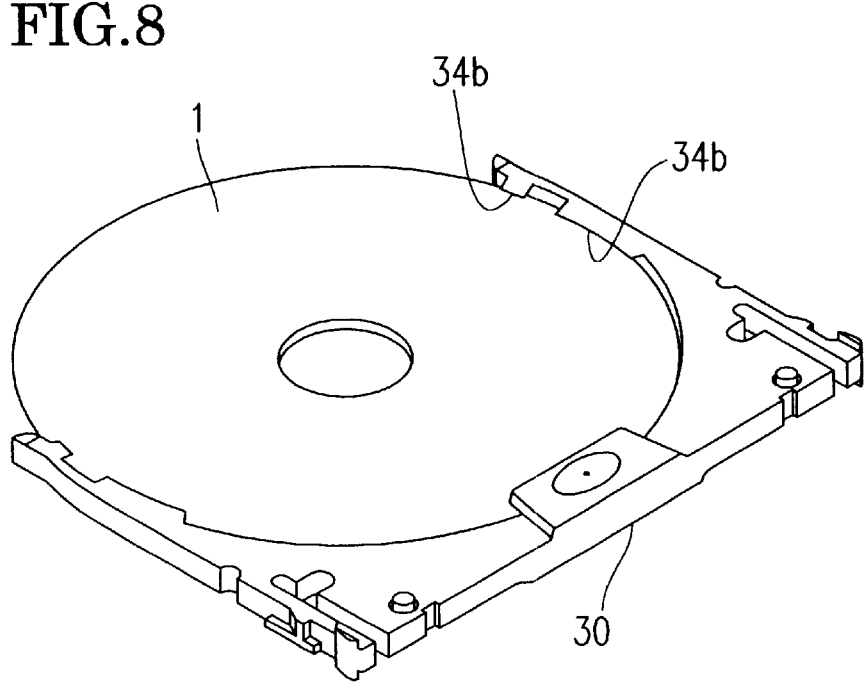
FIG. 8 is a perspective view of a disc placed in the disc holder of FIG. 7.

Referring to FIG. 7, the disc holder 30 includes a body 31 and arms 32 extending from the body 31. The body 31 and the arms 32 are integrally formed by molding a resin or other polymeric material such as plastic. A peripheral wall 33 extends along the inner peripheries of the body 31 and the arms 32 of the disc holder 30 and has a curve corresponding to the outer perimeter of the disc 1. The peripheral wall 33 therefore partly surrounds the outer perimeter of the disc 1 when the disc 1 is placed in position as shown in FIG. 8.

The disc holder 30 includes a plurality of disc supports 34. The disc supports 34 include: a first disc support 34a protruding from the center of the body 31 in the same direction as that in which the arms 32 extend; and second disc supports 34b protruding from each of the arms 32 in the direction perpendicular to the peripheral wall 33. The disc supports 34 are designed to support the top and bottom surfaces of the disc 1 when the disc 1 is placed in position. They are therefore located at positions corresponding to the respective surfaces of the disc 1 so as to sandwich the disc 1. It should be noted that the space $T_1$ (distance measured in. the thickness direction) between upper and lower protrusions of the disc supports 34 is at least slightly larger than the thickness $T_0$ of the disc 1. The disc supports 34 are therefore prevented from pressing both surfaces of the disc 1 simultaneously. For example, if the thickness To of the disc 1 is 1.2 mm, the space $T_1$ will be set at 3.1 mm. In this way, with a gap between the disc 1 and the disc supports 34, the disc 1 is rotatable when it is placed in the disc holder 30. As shown in FIG. 8, when the disc 1 is placed in position in the disc holder 30 supported substantially in parallel, the bottom surface of the disc 1 is in contact with the lower protrusions of the disc supports 34, but the top surface of the disc 1 is free from contact with the upper protrusions of the disc supports 34.

Figure 9:
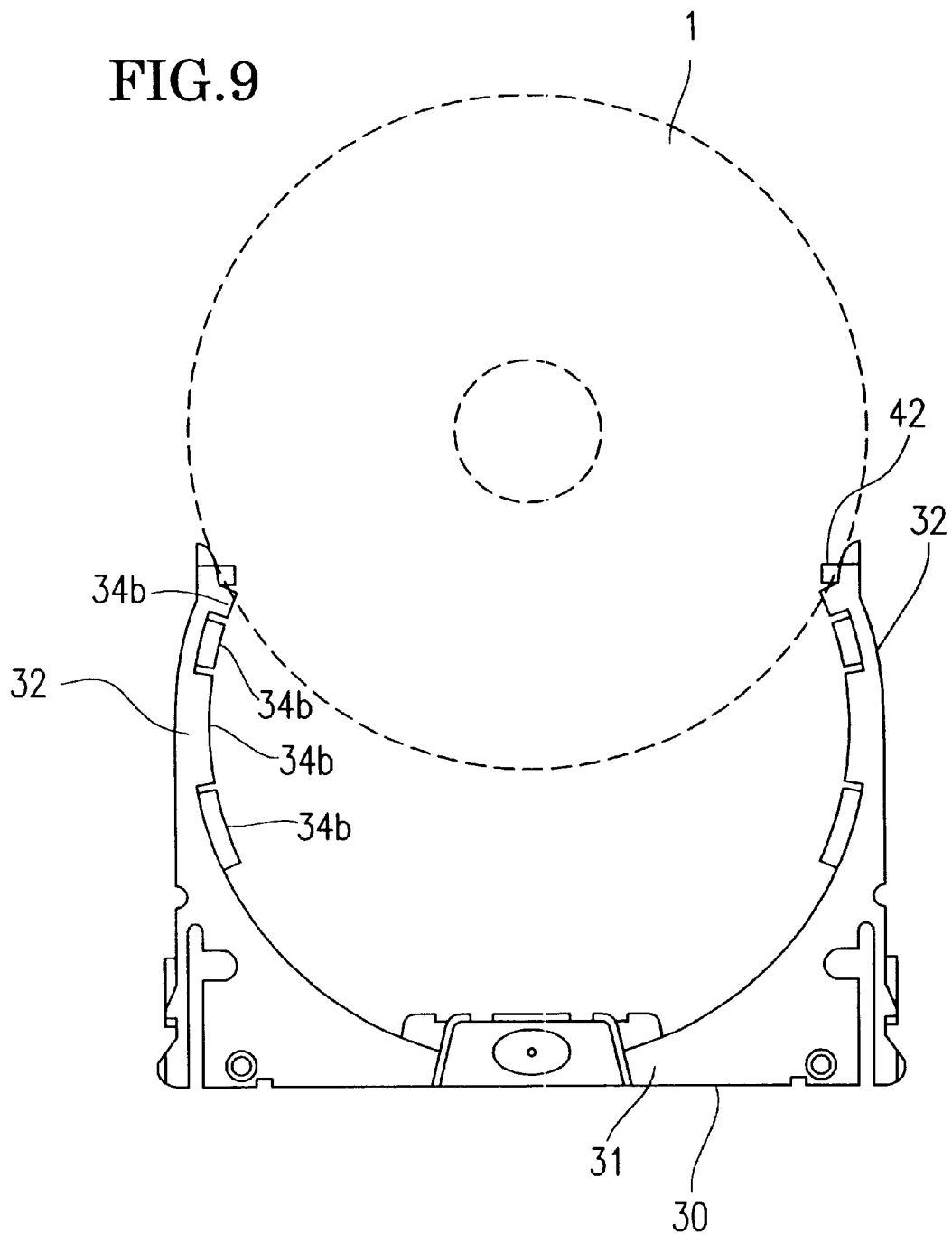
FIG. 9 is a perspective view of a disc being inserted into the disc holder of FIG. 7.

The insertion of the disc 1 into the disc holder 30 will be described with reference to FIG. 9.

First, the disc 1 is positioned so as to abut against the distal ends of the arms 32 of the disc holder 30, and is inserted between the second disc supports 34b and guide pieces 42. The guide pieces 42 are disposed adjacent to the second disc supports 34b near the distal ends of the arms 32, extending from the peripheral wall 33 at the edge thereof vertically opposite to the edge from which the second disc supports 34b extend, in the direction perpendicular to the peripheral wall 33 toward the center of the disc 1.

As the disc 1 is further pushed toward the body 31 of the disc holder 30, the arms 32 are temporarily elastically deformed outwardly to receive the disc 1. During the insertion, the guide pieces 42 and the second disc supports 34b guide the disc 1 to facilitate the insertion of the disc 1 into the disc holder 30. Once the disc 1 has been set in position in the disc holder 30, the arms 32 resume their original shapes and thus block the disc 1 from moving in the upward direction as is viewed from FIG. 9.

When the disc 1 is to be removed from the disc holder 30, the reverse operation may be done. In particular, while the disc 1 is being pulled out from the disc holder 30, the arms 32 are pressed outward by the perimeter of the disc 1 to be gradually widened until the distance between the top ends of the arms 32 is equal to or larger than the diameter of the disc 1.

Next, the structure of the grip 35 of the disc holder 30 will be described.

Figure 12:
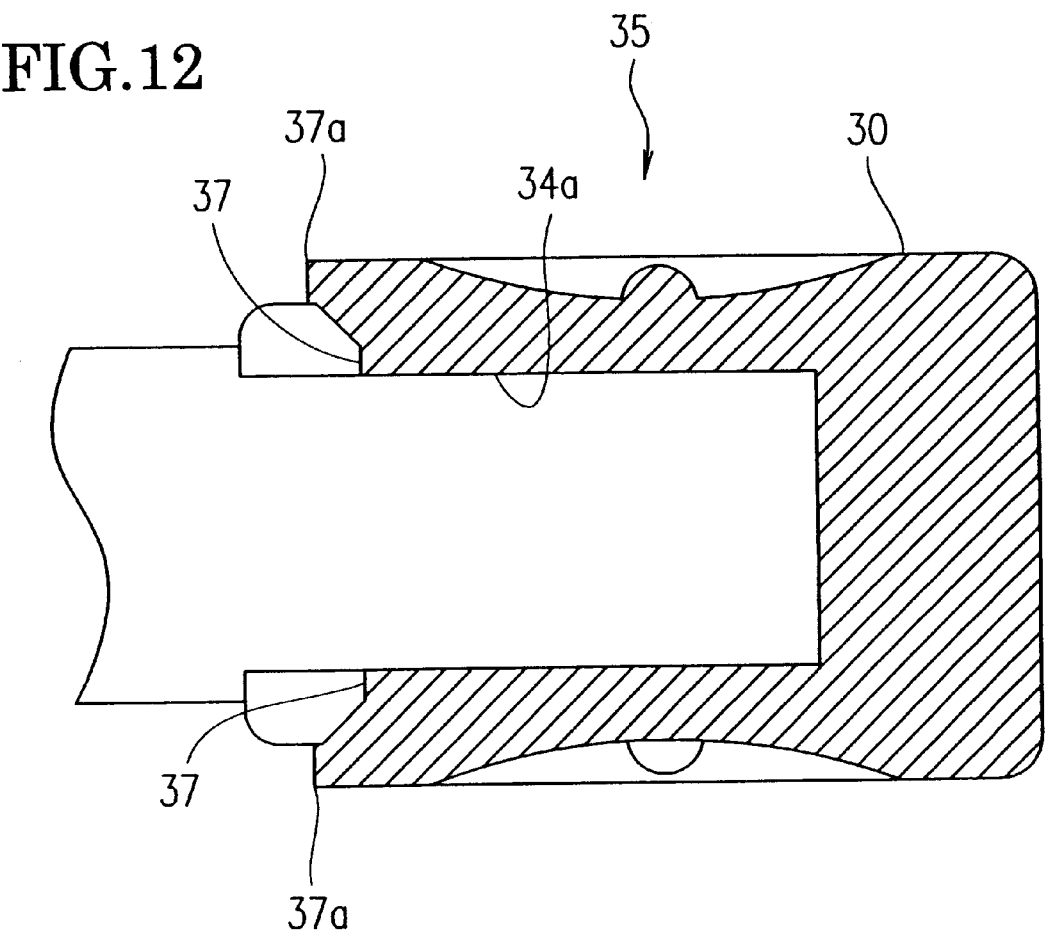
FIG. 12 is an enlarged partial cross-sectional view illustrating stop recesses formed on the disc holder of FIG. 7.

Referring to FIG. 12, the grip 35 has an upper portion and a lower portion extending laterally from the rear end portion of the disc holder 30, forming a structure roughly C-shaped in cross-section. When the disc 1 is placed in position in the disc holder 30, part of the perimeter of the disc 1 is sandwiched between the upper and lower portions of the grip 35. The grip 35 therefore serves as the first disc support 34a.

Figure 10:
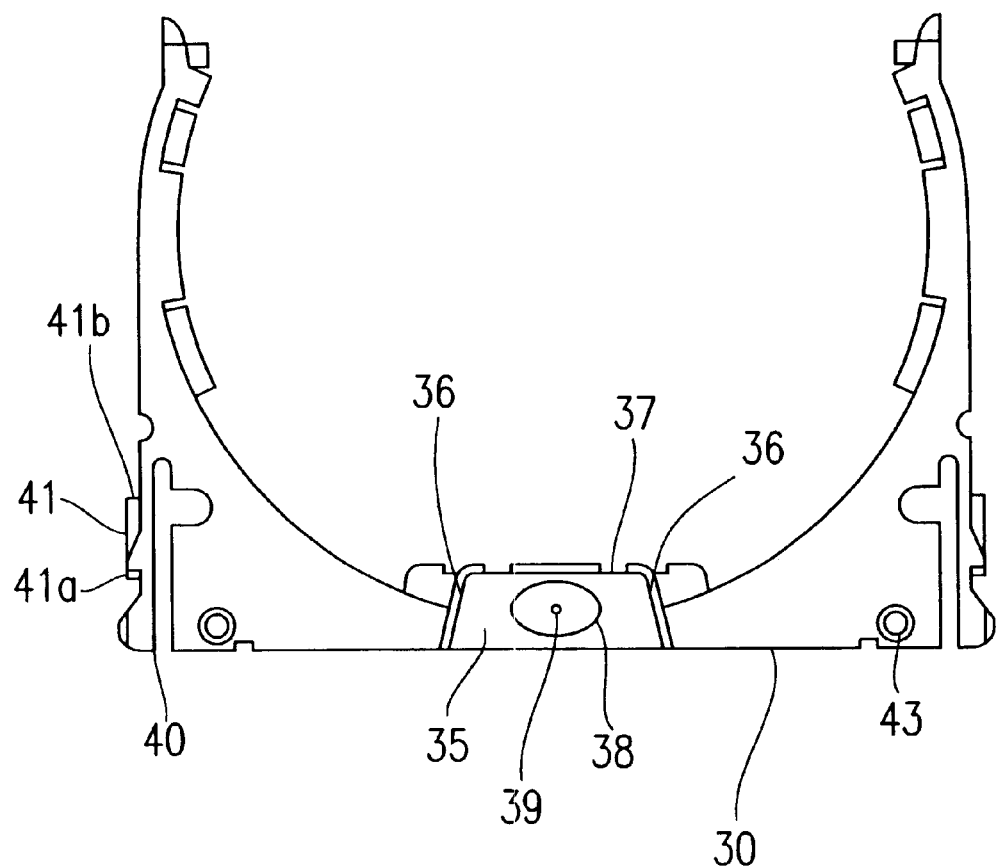
FIG. 10 is a top plan view of the disc holder of FIG. 7.
Figure 11:
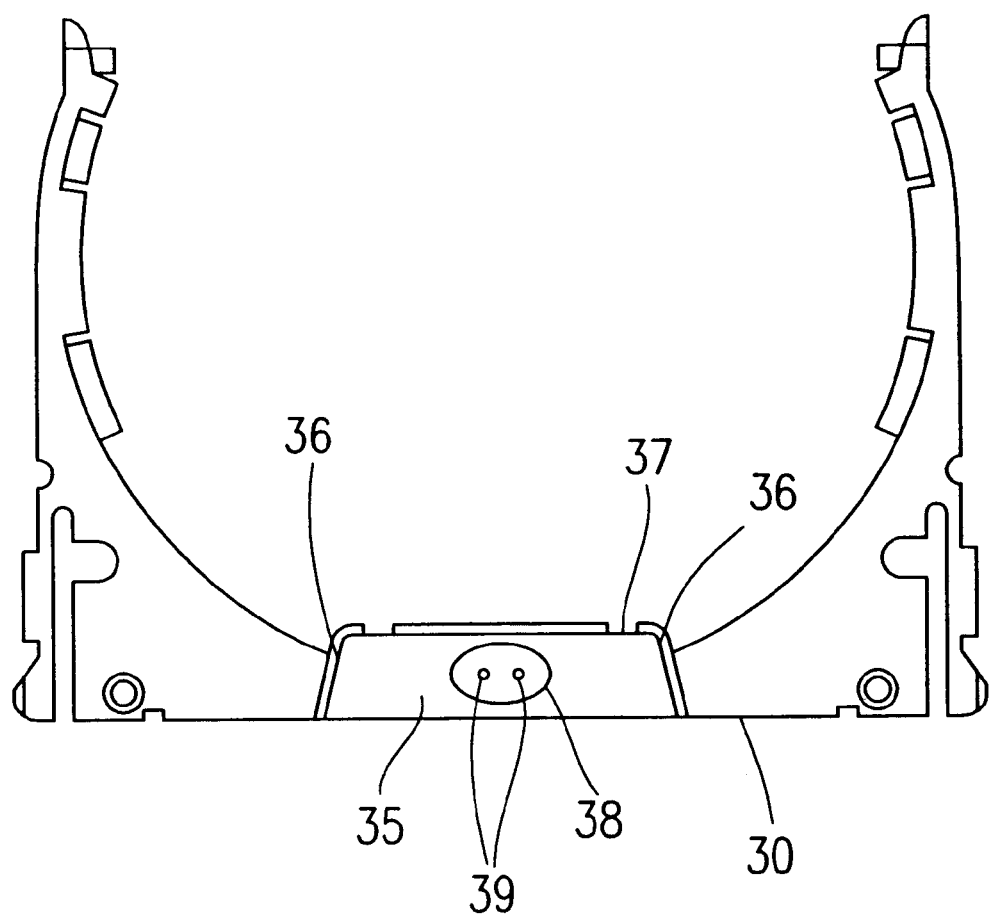
FIG. 11 is a bottom plan view of the disc holder of FIG. 7.

Referring to FIG. 10 and FIG. 11, the grip 35 has inwardly tapered sides as shown by the reference numeral 36. The cuts 18 of the case body 10 have; also a tapered shape corresponding to the tapers of the grip 35 as shown in FIG. 5 and FIG. 6. This facilitates smooth engagement between the grip 35 and the cuts 18 without causing unwanted interference with each other when the disc holder 30 is inserted into the case body 10. More particularly, at the start of the engagement, the narrower top end faces of the grip 35 enter the wider part of the cuts 18 of the case body 10, giving a sufficient spatial allowance therebetween.

Referring again to FIGS. 12, 13 and 14, the stop recesses 37 are formed on the top end faces of the grip 35, i.e., the first disk support 34a, to engage with the stop lugs 19 of the case body 10. The stop recesses 37 and the stop lugs 19 constitute a deformation protection means for protecting the main walls 11 of the case body 10 from deforming outwardly.

As is apparent from FIG. 10 and FIG. 11, the upper and lower portions of the grip 35 of this embodiment are different in shape and size from each other. The upper portion of the grip 35 is in a shape of a larger trapezoid having, for example, a top end of 20 mm, a bottom end of 22 mm, and a height of 8 mm. The lower portion of the grip 35 is in a shape of a larger trapezoid having, for example, a top end of 30 mm, a bottom end of 32 mm, and a height of 8 mm. As shown in FIG. 5 and FIG. 6, the cuts 18 of the upper and lower cases 10a and 10b are shaped to correspond to the shapes of the upper and lower portions of the grip 35. This prevents the disc holder 30 from being inserted into the case body 10 upside down. That is, if the disc holder 30 is inserted upside down, the top end face of the grip 35 collides with the entrance corners of the cut 18, blocking the disc holder 30 from further entering the case body 10. Thus, in this embodiment, with the upper and lower portions having different shapes, the grip 35 itself serves as a "mis-insertion protection means".

In this embodiment, improper combination between the upper and lower portions of the grip 35 and the cuts 18 of the upper and lower cases 10a and 10b will be visually recognized since the upper and lower portions of the grip 35 are clearly distinguished in shape and size from each other. In particular, the lateral size of the upper portion of the grip 35 is designed to be smaller than that of the lower portion thereof by 5 mm or more. Therefore, the user grasping the disc holder 30 can insert the disc holder 30 into the case body 10 with the correct orientation without difficulty. In this embodiment, identification means recognizable by a touch of a finger are formed on the surfaces of the grip 35. In particular, recesses 38 are formed on the surfaces of the grip 35, and in the center of each recess 38 is formed a convex identification mark 39 recognizable by a touch of a finger. The upper portion of the grip 35 includes a recess 38 with a single identification mark 39 and the lower portion of the grips 35 includes a recess 38 with two identification marks 39. Therefore, with only a touch of a finger on the identification marks 39, whether it is side A or side B of the disc cartridge 100 can be recognized. The identification mark 39 in this embodiment is of a convex shape. Any other shape can also be used for the identification mark 39 as long as it is recognizable by a touch of a finger. For example, it may be of a concave shape.

With reference to FIGS. 10 to 15, a special structure (deformation protection means) provided for engagement between the grip 35 and the case body 10 will be described.

As most apparently shown in FIG. 10 and FIG. 11, two concave portions (i.e., the stop recesses 37) are formed on each of the front end faces of the grip 35 for receiving the two stop lugs 19 extending from the cut 18 shown in FIGS. 5 and 6.

Figure 13:
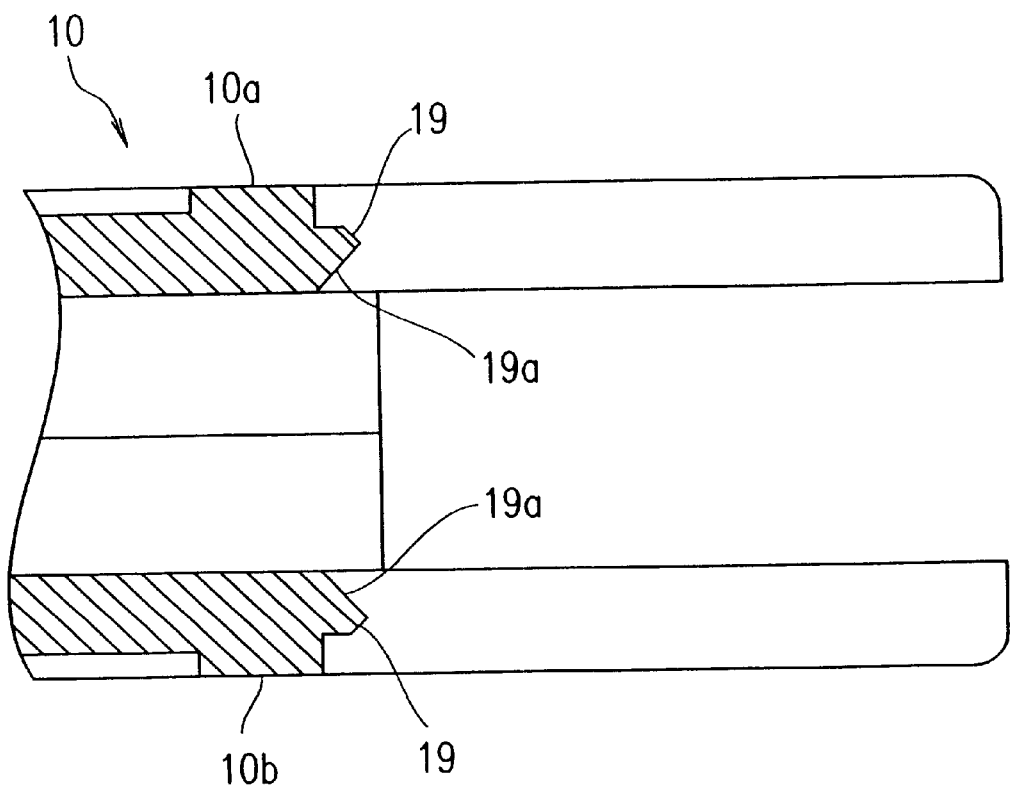
FIG. 13 is an enlarged partial cross-sectional view illustrating stop lugs formed on a case body of the disc cartridge of FIG. 1.
Figure 14:
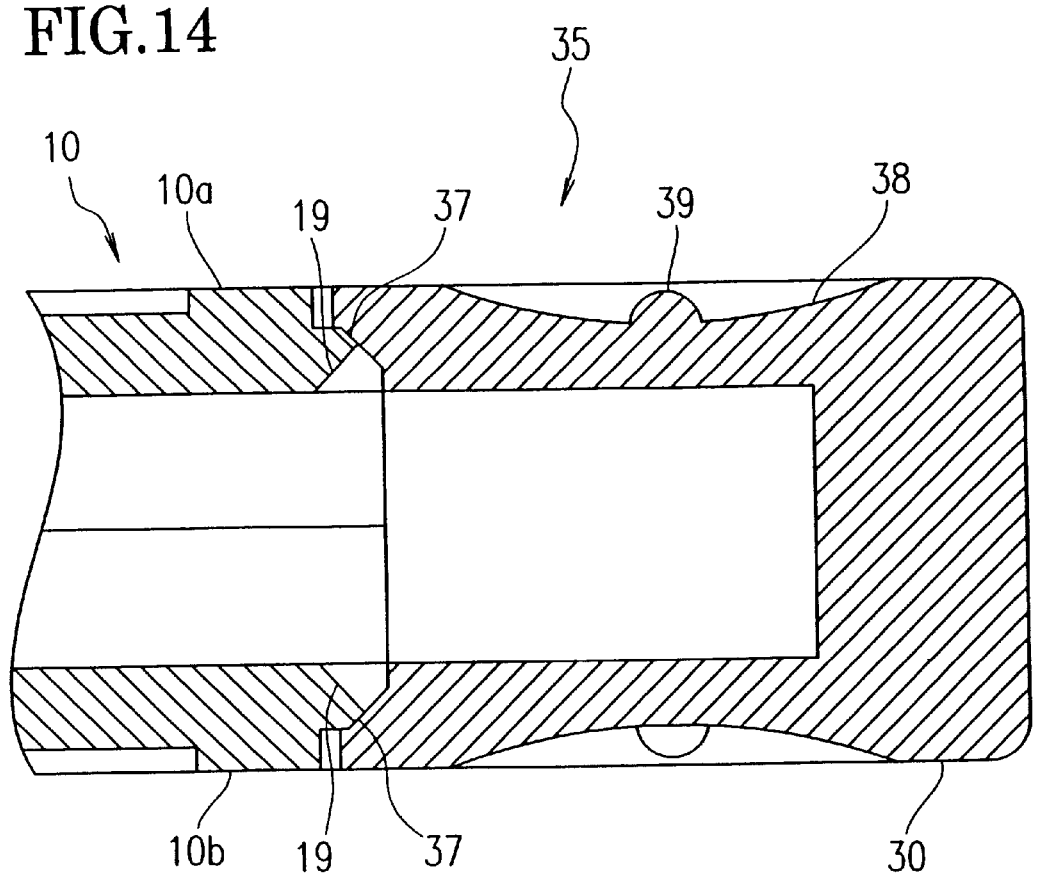
FIG. 14 is an enlarged partial cross-sectional view illustrating the stop recesses of the disc holder engaging the stop lugs of the case body.
Figure 15:
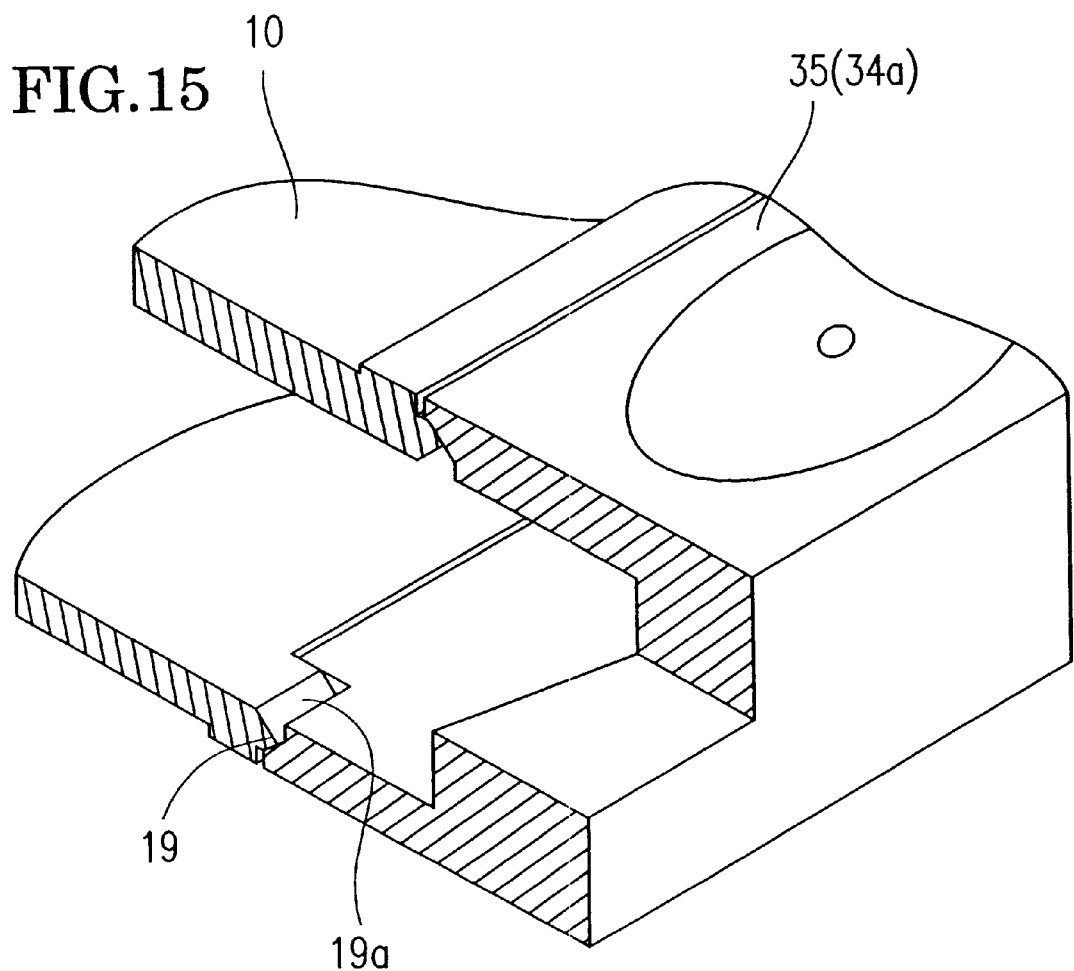
FIG. 15 is a partial cutaway perspective view illustrating the stop recesses of the disc holder engaging the stop lugs of the case body.

As shown in FIG. 12, each of the stop recesses 37 is a concave portion extending laterally toward the rear end portion of the grip 35. As shown in FIG. 13, each of the stop lugs 19 of the case body 10 protrudes laterally from the cuts 18 of the case body 10. FIG. 14 illustrates the disc holder 30 completely inserted into the case body 10. As is apparent from FIG. 14, the stop lugs 19 have a shape and size that engage those of the stop recesses 37. FIG. 15 is a perspective view illustrating the stop lugs 19 and the stop recesses 37 engaging with each other.

The top surface of the grip 35 of the disc holder 30, i.e., the first disc support 34a, is substantially in line with the top surface of the case body 10 as shown in FIG. 14. Likewise, the bottom surface of the first disc support 34a is substantially in line with the bottom surface of the case body 10. In other words, the thickness of the grip 35 (the first disc support 34a) is substantially the same as that of the case body 10, having no significant step formed between the top surface of the first disc support 34a and the top surface of the case body 10, or between the bottom surface of the first disc support 34a and the bottom surface of the case body 10.

The above construction effectively prevents the peripheries of the cuts 18 from overlapping with the grip 35 of the disc holder 30 and deforming outwardly even when the disc holder 30 is forcibly pushed into the case body 10. This therefore reliably avoids an occurrence of the problem that the disc holder 30 enters the case body 10 too deeply and as a result large steps are formed between the peripheries of the cuts 18 and the surfaces of the grip 35.

In this embodiment, the case body 10 has the stop lugs 19 while the disc holder 30 has the stop recesses 37. This construction may be reversed. That is, the case body 10 may have stop recesses and the disk holder 30 may have stop lugs. Otherwise, the case body 10 may have a stop recess and a stop lug, and the disc holder 30 may have a corresponding stop lug and a corresponding stop recess.

Referring back to FIG. 7, a pair of flexible fingers 40 are formed on the side faces of the body 31 of the disc holder 30. The pair of flexible fingers 40 are the mirror images of each other. Hereinafter, therefore, only one flexible finger 40 will be described for simplification.

The flexible finger 40 extends from the side face of the disc holder 30 toward the rear end thereof and is designed to have a shape that can bend in the plane substantially parallel with the top and bottom surfaces of the disc holder 30. A gap is secured between the distal portion of flexible finger 40 and the disc holder 30 to allow the flexible finger 40 to bend laterally, (i.e. toward and away from the disc holder 30). When a lateral force is applied to the flexible finger 40 by grasping the top ends of the pair of flexible fingers 40 with one hand, the flexible finger 40 bends in the direction reducing the gap between the top end of the flexible finger 40 and the disc holder 30. Upon release of the force applied to the flexible finger 40, the flexible finger 40 resumes its original position by its elastic force.

The lock 41 of a convex shape is formed on the outer side face of the flexible finger 40 for engaging with the stop portions 16 of the case body 10. The lock 41 includes: an escape limit wall 41a for limiting the escape movement of the disc holder 30 from the case body 10; and the insertion limit wall 41b for limiting the insertion movement of the disc holder 30 into the case body 10.

The insertion limit wall 41b is formed at the position allowing the wall to abut against the insertion stop wall 16b of the stop portion 16 of the lower case 10b for limiting the insertion of the disc holder 30. The escape limit wall 41a is formed at the position allowing the wall to abut against the escape stop wall 16a of the stop portion 16 of the upper case 10a for limiting the escape of the disc holder 30.

By deforming the flexible finger 40 toward the disc holder 30, the lock 41 moves to the position at which it is not limited by a protrusion including the escape limit wall 16a.

Figure 16:
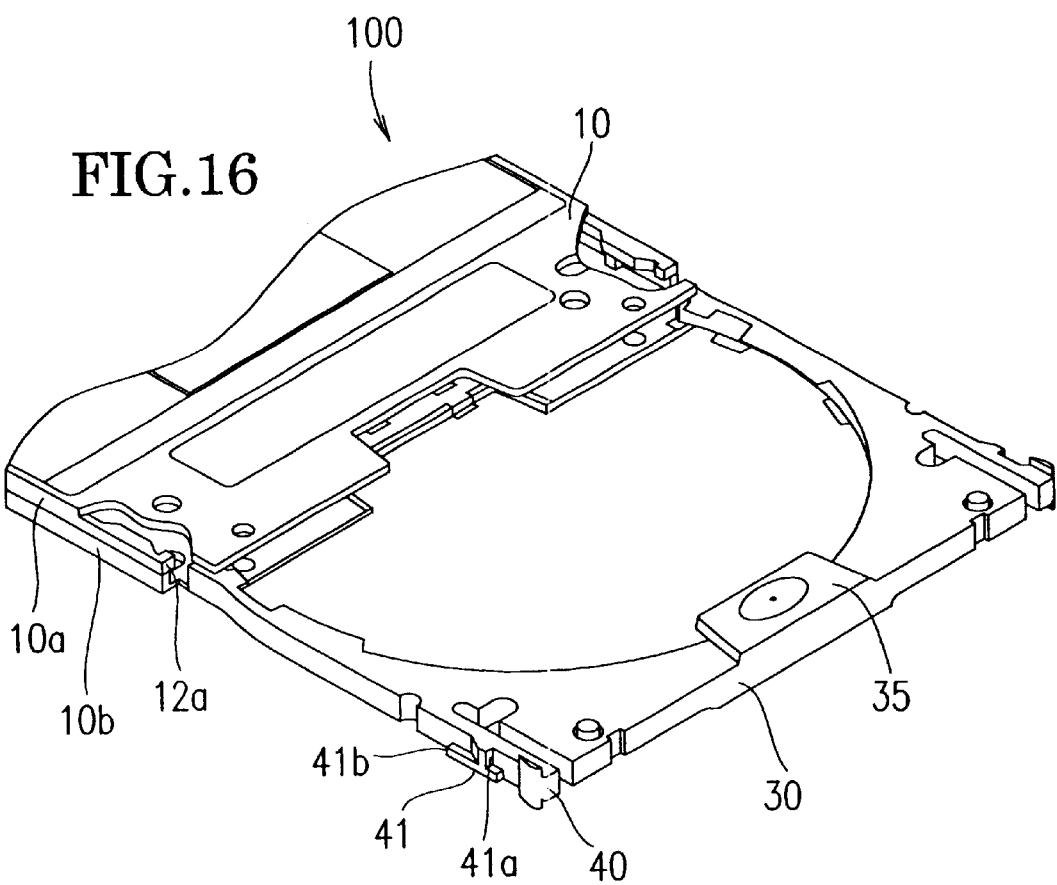
FIG. 16 is a perspective view of the disc cartridge of FIG. 1 with the disc holder inserted halfway.
Figure 17:
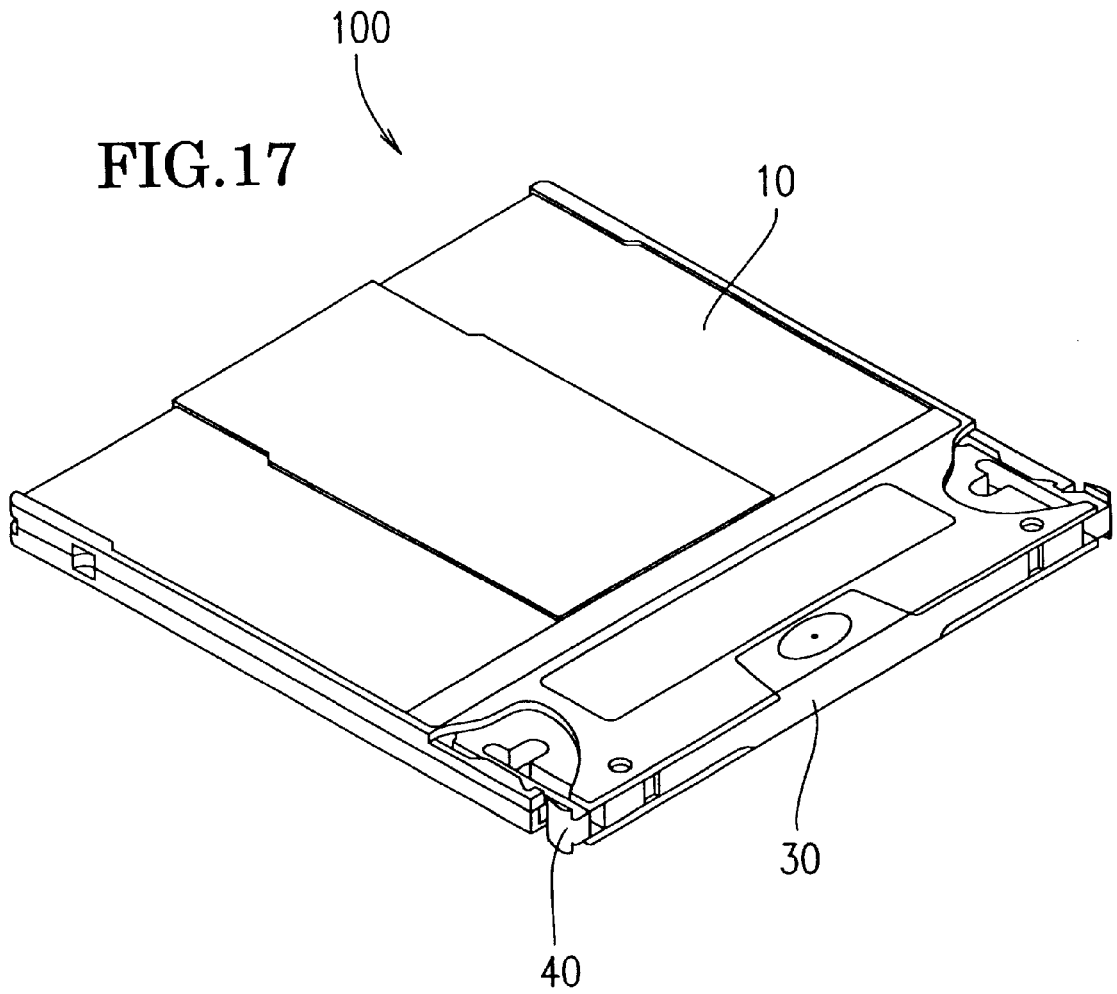
FIG. 17 is a perspective view, partially broken away, of the disc cartridge of FIG. 1 with the disc holder completely inserted and locked.

Referring to FIG. 16, as the disc holder 30 is pushed into the case body 10, a slope of the lock 41 is first pushed by the protrusion (end 12a of the wide wall 12) of the case body 10, deforming the flexible finger 40, before the insertion limit wall 41b of the lock 41 abuts against the insertion stop wall 16b of the stop portion 16 of the lower case 10b. Once the slope of the lock 41 overrides the protrusion of the case body 10, the flexible finger 40 elastically resumes its original position. At this point, as shown in FIG. 17, a protrusion including the escape limit wall 41a of the lock 41 receives the stop portion 16 of the upper case 10a. In this manner, the lock 41 of the disc holder 30 is sandwiched by the escape stop wall 16a and the insertion stop wall 16b, so that the disc holder 30 is firmly secured in place. More specifically, the escape limit wall 41a of the lock 41 is nearly in contact with the escape stop wall 16a of the case body 10, and the insertion limit wall 41b of the lock 41 is nearly in contact with the insertion stop wall 16b of the case body 10. As a result, the forward and backward movement of the lock 41 is blocked by the escape stop wall 16a and the insertion stop wall 16b of the case body 10.

In order to release the locking between the stop portions 16 of the case body 10 and the locks 41, the pair of flexible fingers 40 may be pressed inwardly toward the disc holder 30. The distance between the pair of flexible fingers 40, that is, the lateral length of the rear end of the case body 10, is about 50 to 130 mm (e.g., 90 mm), which is within the range permitting the pair of flexible fingers 40 to be grasped and pressed inwardly with one hand. When the flexible fingers 40 are bent laterally to reduce the gap between the top end of the flexible fingers 40 and the disc holder 30, the escape limit walls 41a of the locks 41 withdraw to the position at which they do not collide with the escape stop walls 16a. In this way, the disc holder 30 can be removed from the case body 10.

Figure 18:
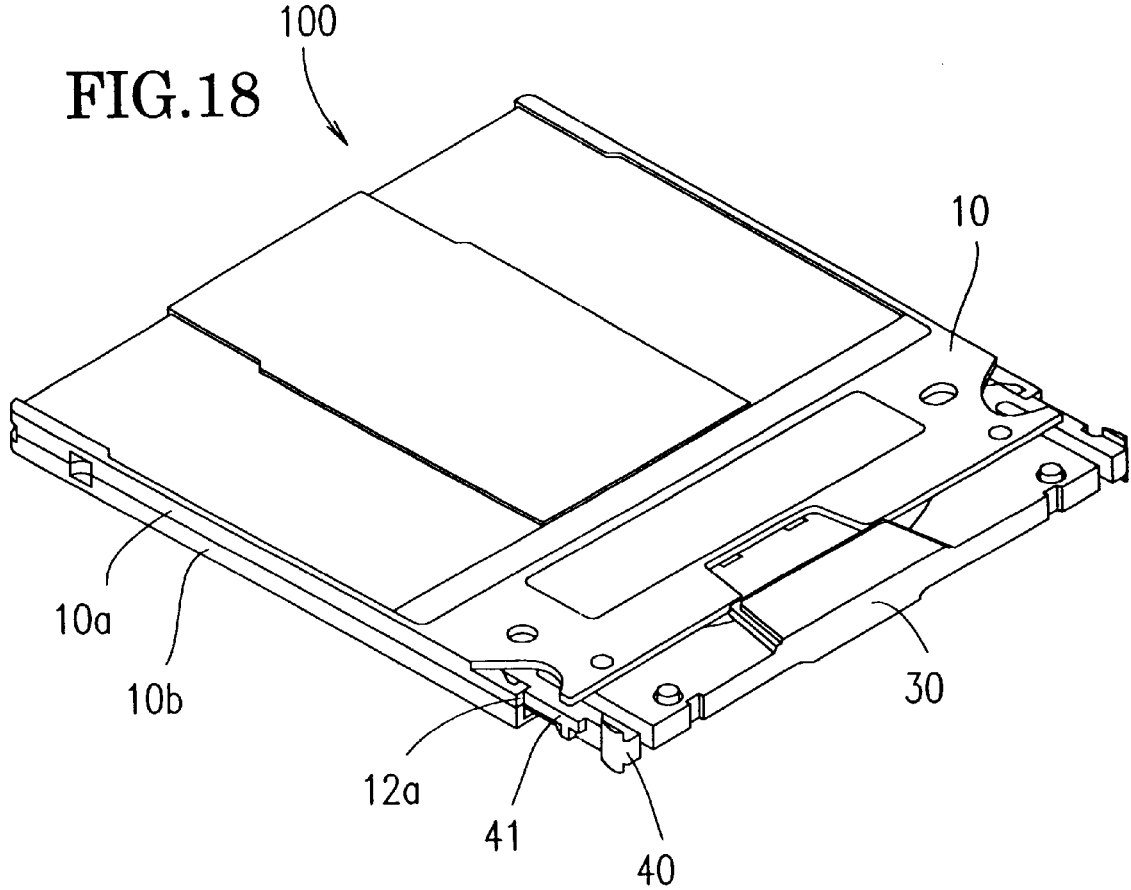
FIG. 18 is a perspective view, partially broken away, of the disc cartridge of FIG. 1 with the disc holder inserted upside down.

FIG. 18 shows an attempt to insert the disc holder 30 into the case body 10 upside down. When it is attempted to insert the upside-down disc holder 30, the insertion limit wall 41b of the lock 41 collides with the end 12a of the side wall 12 of the upper case 10a, whereby further insertion is prevented.

When the insertion limit wall 41b of the lock 41 collides with the end 12a of the case body 10, the grip 35 also collides with the peripheries of the cut 18, whereby further insertion is prevented. In this embodiment, the position of t he insertion limit wall 41b is adjusted so that the collision between the insertion limit wall 41b and the end 12a of the side wall 12 of the upper case 10a simultaneously occurs with the collision between the grip 35 and the peripheries of the cut 18 to further prevent mis-insertion of the disc holder 30.

Hereinafter, assembly of the disc cartridge will be described. First, as shown in FIG. 9, the disc 1 is inserted between the guide pieces 42 and the second disc supports 34b formed adjacent to the guide pieces 42. The disc 1 proceeds along the arms 32 while being guided by the guide pieces 42 and the second disc supports 34b. As the disc 1 proceeds into the disc supports 34, the arms 32 are deformed outwardly by the outer perimeter of the disc 1. The two arms 32 are deformed outward to be gradually widened until the distance between the distal ends of the arms 32 is as large as the diameter of the disc 1. Once the disc 1 is placed in position, the arms 32 resume their original positions in which, the arms 32 are free from elastic deformation, and thus a gap exists between the perimeter of the disc 1 and the peripheral wall 33. Nevertheless, the disc 1 does not slip off from the disc holder 30 since it is supported by the disc supports 34.

Next, the disc holder 30 is registered with the lower case 10b and then mounted on the lower case 10b. At this time, the stop lugs 19 of the lower case 10b and the stop recesses 37 of the disc holder 30 are not yet engaged with each other. The stop lugs 19 of the lower case 10b are therefore pressed downwardly by the walls of the stop recesses 37 of the disc holder 30, resulting in that the part of the main wall 11 in the periphery of the cut 18 of the lower case 10b is bent downward.

The resultant lower case 10b is registered with the upper case 10b and then combined with the upper case 10a. At this time, also, the stop lugs 19 of the upper case 10a and the stop recesses 37 of the disc holder 30 are not yet engaged with each other. The stop lugs 19 of the upper case 10b are therefore pressed upwardly by the walls of the stop recesses 37 of the disc holder 30, resulting in that the part of the main wall 11 in the periphery of the cut 18 of the upper case 10a is bent upward.

The upper and lower cases 10a and 10b are then bonded together by ultrasonic deposition or the like. The bonding of the upper and lower cases 10a and 10b is made by pressing the upper and lower cases against each other with an external force. By this pressing, therefore, the bending of the main walls 11 of the case body 10 is avoided More particularly, at first, corners 37a of the stop recesses 37 shown in FIG. 12 abut against slopes 19a of the stop lugs 19 shown in FIG. 13. By the press bonding between the upper and lower cases 10a and 10b, the slopes 19a are pressed to pass over the corners 37a, whereby the stop lugs 19 and the stop recesses 37 engage with each other as shown in FIG. 14 with the stop lugs 19 being sandwiched by the stop recesses 37 to prevent the case body 10 from deforming outwardly.

After the case body 10 has been assembled as described above, the shutter 2 is slidably placed in position from the front end portion of the case body 10. In this way, the assembly of the disc cartridge 110 is completed. The disc 1 is rotatably housed in the thus-assembled disc cartridge 110.

As the disc cartridge 100 is being pushed into a disc drive compatible with the disc cartridge 100, the shutter 2 is slid open to expose the access openings 15. Once the disc cartridge 100 is mounted in a predetermined position in the disc drive, a disk motor (not shown) enters the center hole of the disc 1 in the disc cartridge 100. Also, a head enters through the access opening 15 to allow for recording, reproduction, and erasing of information for the exposed surface of the disc 1.

Removal of the disc holder 30 placed in the disc cartridge 100 will be described. First, the user breaks off the disc removal identifier 43 shown most clearly in FIG. 7. In the disc cartridge 100 assembled as described above, the disc removal identifier 43 fits with the disc removal identification holes 21 of the case body. The disc removal identifier 43 in this state may be broken off by inserting a rigid fine pin into the disc removal identification holes 21. Once the identifier 43 is broken off, the disc holder 30 is ready for removal from the case body 10.

Thereafter, the user presses inwardly the pair of flexible fingers 40 on both sides of the disc holder 30 with one hand to elastically deform the flexible fingers 40. This releases the locking between the locks 41 on the flexible fingers 40 and the stop portions 16 of the case body 10, thereby releasing the disc holder 30 for removal from the case body 10.

After drawing the disc holder 30 slightly outwardly, the user grasps the grip 35 with fingers and pulls it forward, to completely remove the disc holder 30 from the case body 10. Simultaneously, the disc 1 is pushed together with the peripheral wall 33 of the disc holder 30 and thus removed together with the disc holder 30.

After the disc holder 30 is completely removed from the case body 10, the disc 1 is prevented from slipping off from the disc holder 30 since the disc supports 34 support the top and bottom surfaces of the disc 1. During removal, the possibility of a finger touching the disc 1 when the user grasps the grip 35 is small since the grip 35 is thicker than the body 31 of the disc holder 30.

Re-insertion of the disc holder 30 that has once removed from the case body 10 into the case body 10 will be described.

The distal ends of the arms 32 of the disc holder 30 are inserted into the insertion opening 14. As the disc holder 30 is pushed into the case body 10, the escape limit wall 41a of the lock 41 of each side first abuts against the end 12a of the side wall 12 of the upper case 10a so that the flexible finger 40 is deformed inward allowing the lock 41 to override the end 12a. The disc holder 30 is further pushed into the case body 10 up to the position where the insertion limit wall 41b of the lock 41 abuts against the insertion stop wall 16b of the stop portion 16. At that position, the elastic deformation of the flexible finger 40 is released, and the escape limit wall 41a of the lock 41 abuts against the escape stop wall 16a of the stop portion 16. Substantially simultaneously, the stop lugs 19 and the stop recesses 37 engage with each other. Thus, deformation of the case body 10 such as curling is prevented, and the disc holder 30 is secured in the case body 10.

Next, upside-down insertion of the disc holder 30 into the case body 10 will be described. The top ends of the arms 32 of the disc holder 30 are inserted into the insertion opening 14. As the disc holder 30 is being pushed into the case body 10, the front end of the grip 35 collides with the entrance corners of the cut 18, whereby further insertion is blocked. Substantially simultaneously, the insertion limit wall 41b of the lock 41 on each side collides with the end 12a of the side wall 12 of the case body 10, to ensure the blocking of further insertion. The user can visually recognize the wrong combination between the upper and lower portions of the grip 35 and the cuts 18 of the upper and lower cases 10a and 10b. With this construction, it is ensured that the disc holder 30 is insertable only in the correct orientation.

As described above, in this embodiment, the grip 35 is provided on the disc holder 30. This facilitates the grasping of the disc holder 30 with fingers and thus improves the operability of the disc holder 30 when the disc holder 30 is inserted into and removed from the case body 10. The grip 35 is thicker than the body 31 of the disc holder 30. This reduces the possibility of a finger touching the disc 1 when the disc holder 30 is grasped with fingers.

The formation of the grip 35 also improves the rigidity of the disc holder 30, and thus the size of the center portion of the body 31 can be reduced., This greatly contributes to the size reduction of the disc cartridge 100.

In this embodiment, the disc 1 is supported by the first disc support 34a extending from the center of the body 31 of the disc holder 30 and the second disc supports 34b extending from each of the arms 32. This permits a gap to be formed between the perimeter of the disc 1 and the peripheral wall of the disc holder 30 when the disc 1 is placed in position. In other words, the arms 32 are free from stress parallel with the disc plane from the disc 1 placed in position. It is therefore possible to rotate the disc 1 inside the case body 10 without the necessity of pressing the arms 32 outward to widen the space between the arms 32 when the disc holder 30 with the disc 1 placed thereon has been completely inserted into the case body 10. Since the disc holder 30 does not use the elastic deformation of the arms 32 to hold the disc 1, the present embodiment is free from the conventional problem that the force of the arms 32 holding the disc 1 is weakened due to stress relaxation of the arms 32 over time. Therefore, the disc 1 is prevented from slipping out of the disc holder 30 when the disc holder 30 is removed from the case body 10 after being mounted in the case body 10 for a long time. This improves the reliability of the disc holder 30. In addition, without the necessity of considering the stress relaxation of the arms 32, integral formation of the arms 32 with the disc holder 30 by plastic molding is possible.

Hereinafter, another embodiment of the present invention will be described with reference to the relevant drawings.

Figure 19:
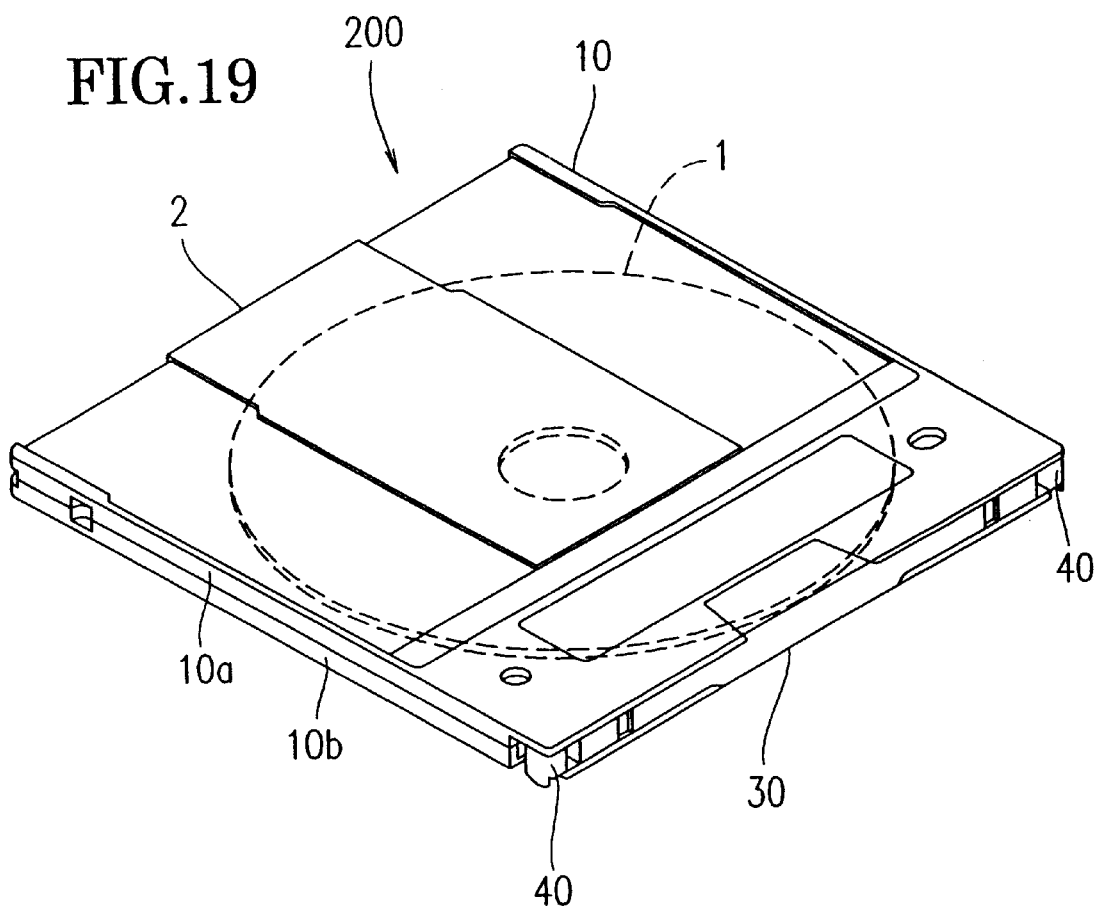
FIG. 19 is a perspective view of a disc cartridge of another embodiment of the present invention.
Figure 20:
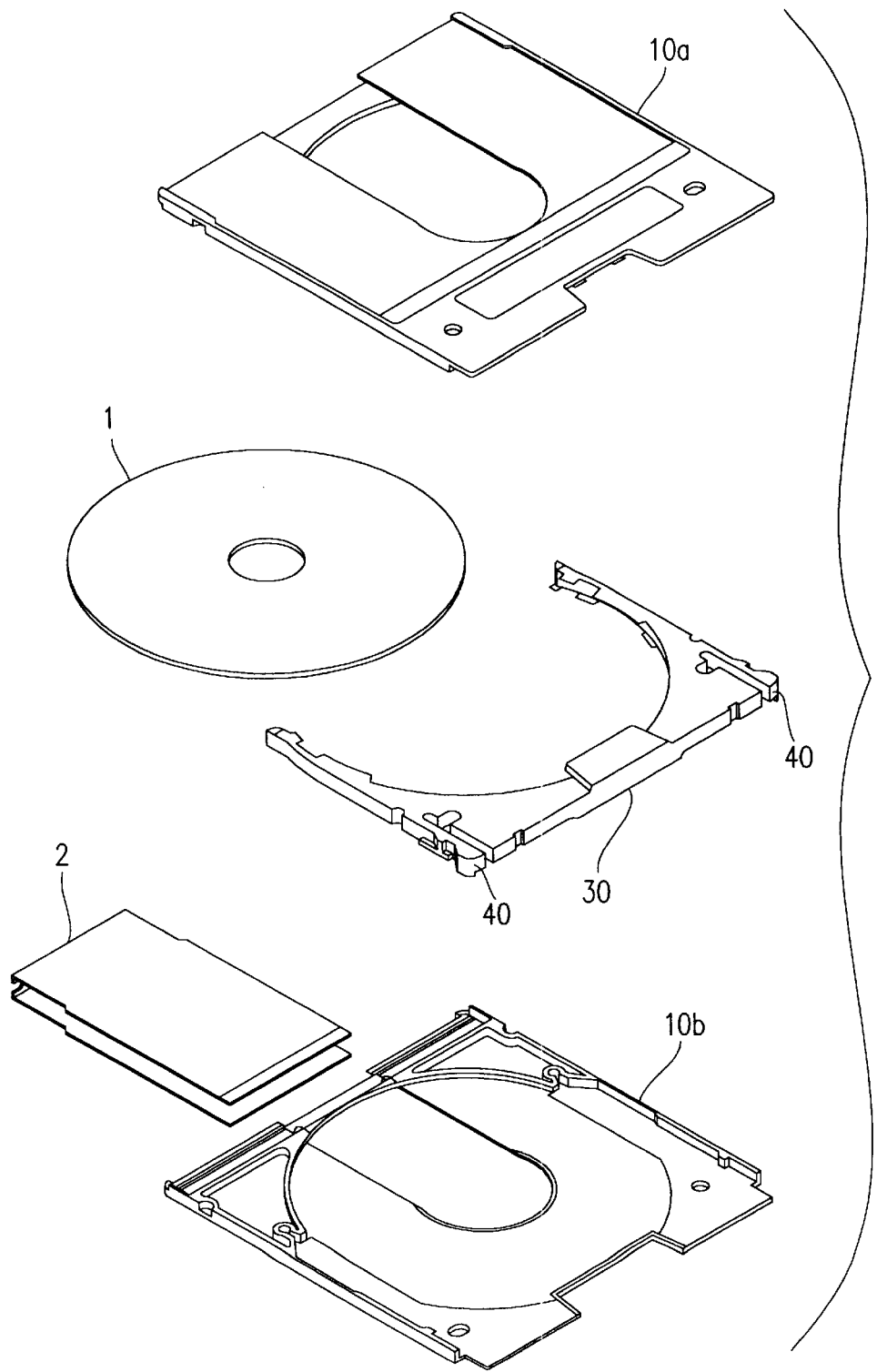
FIG. 20 is an exploded perspective view illustrating the construction of the disc cartridge of FIG. 19.

Referring to FIGS. 19 and 20, a disc cartridge 200 of an embodiment of the present invention is different from the disc cartridge 100 described above in that the flexible fingers 40 are constructed so that the top ends thereof are less likely to be pressed with fingers. As is apparent from FIGS. 19 and 20, the disc cartridge 200 has many common components with the disc cartridge 100, and thus only different components will be described below.

Figure 21:
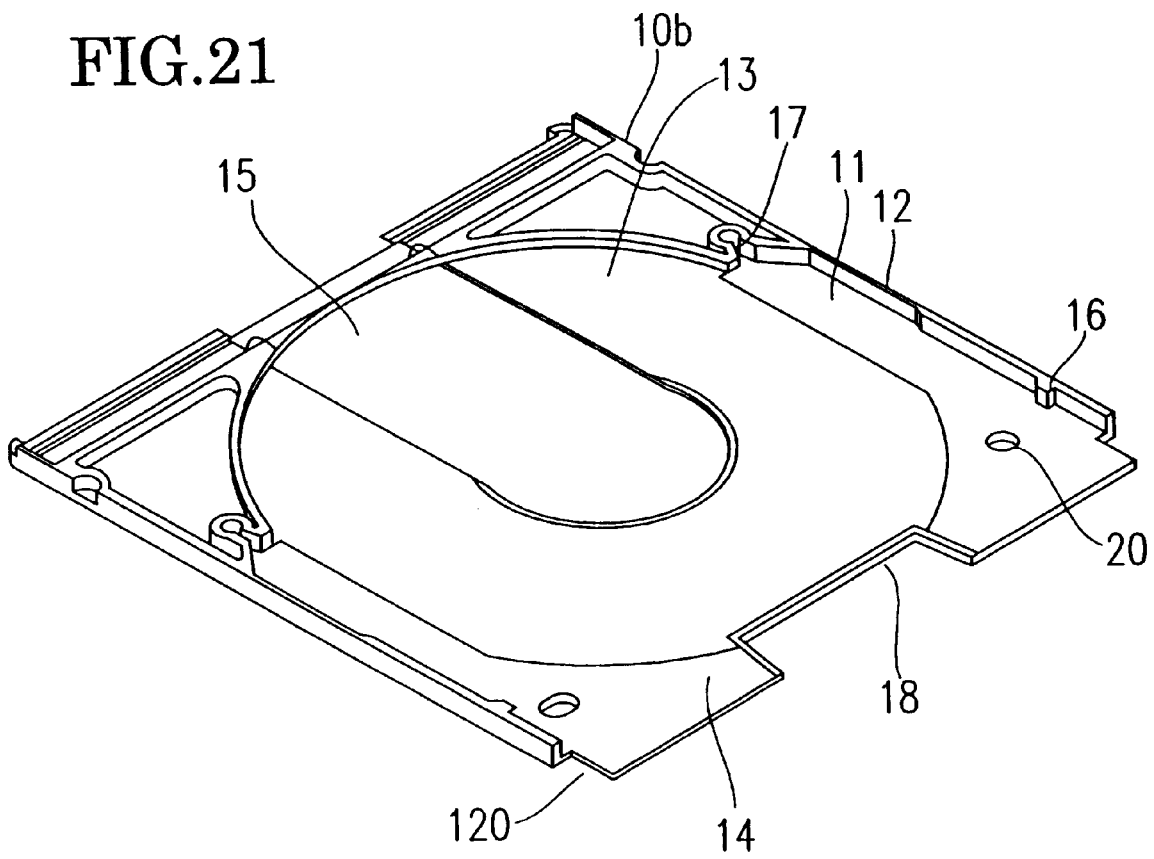
FIG. 21 is a perspective view of a lower case of the disc cartridge of FIG. 19.
Figure 22:
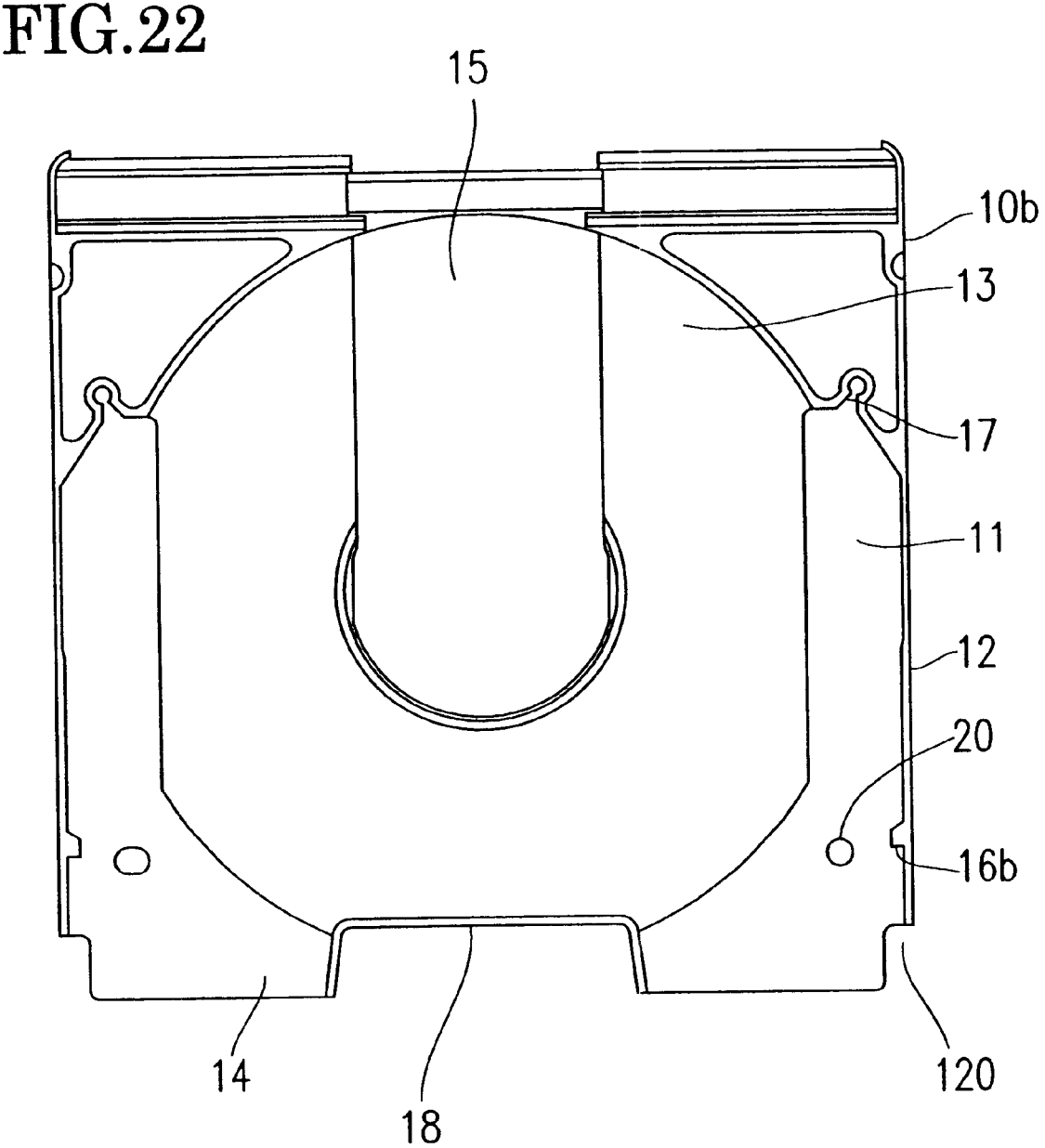
FIG. 22 is a top plan view of the inner surface of the lower case of the disc cartridge of FIG. 19.
Figure 23:
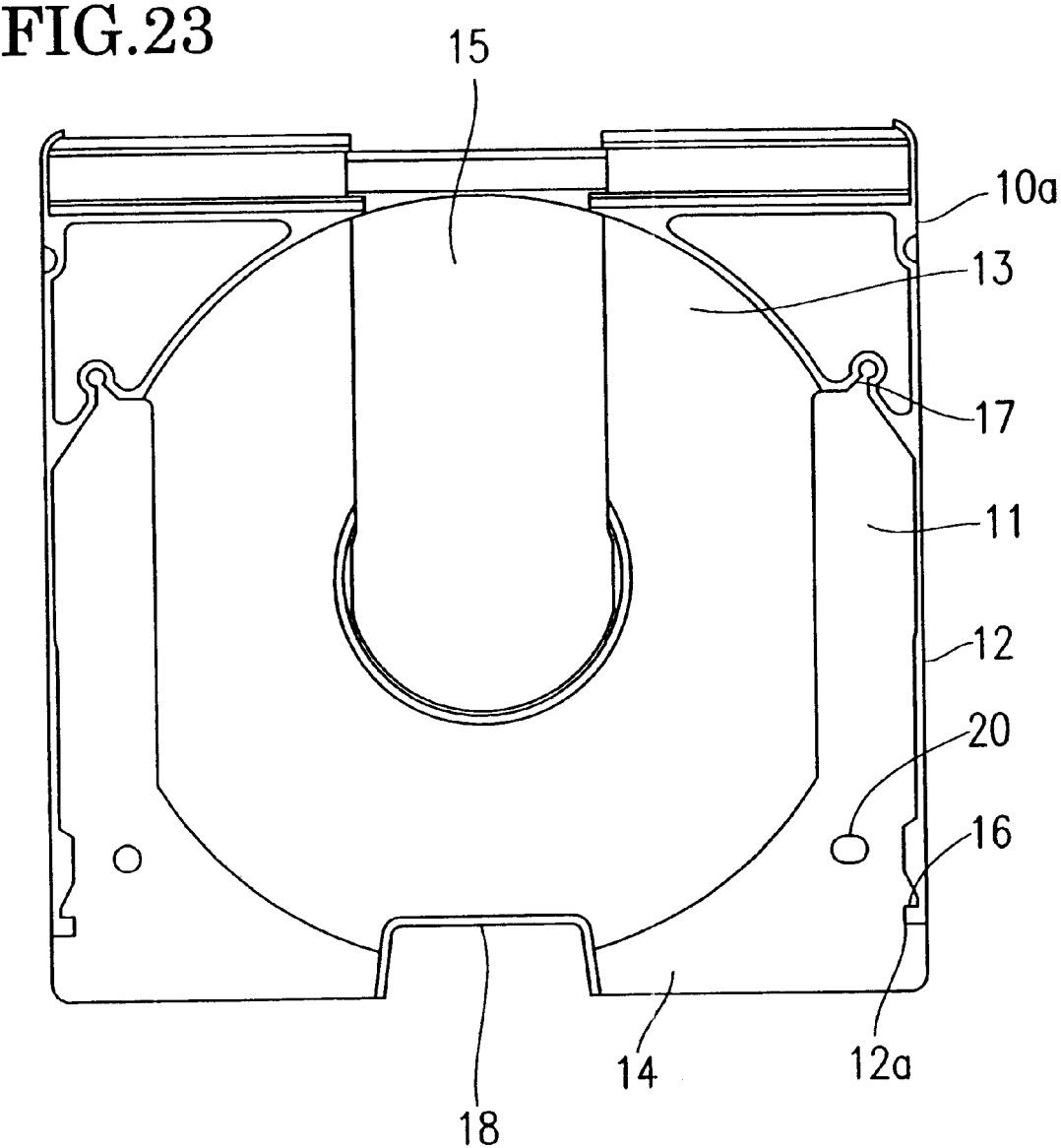
FIG. 23 is a bottom plan view of the inner surface of an upper case of the disc cartridge of FIG. 19.

As shown in FIGS. 21 and 22, the lower case 10b of the disc cartridge 200 has corner cuts 120 at both corners of the rear end portion thereof as in the case of the disc cartridge 100. However, as shown in FIG. 23, the upper case 10a of the disc cartridge 200 has no such corner cuts. As a result, while the lower case 10b allows the top ends of the flexible fingers 40 of the disc holder 30 to be partly exposed, the upper case 10a completely covers the top surfaces of the flexible fingers 40 when the disc holder 30 is placed in position as shown in FIG. 19.

In this embodiment, since the upper case 10a completely covers the top surface of each flexible finger 40, it obstructs the operation of the flexible fingers 40. That is, due to the obstruction of the upper case 10a, the flexible fingers 40 are prevented from being mistakenly pressed inwardly by an accidental touch of a finger on the outer side face of the flexible fingers 40. As a result, the possibility of mistakenly releasing the locking arrangement is significantly reduced.

Figure 24:
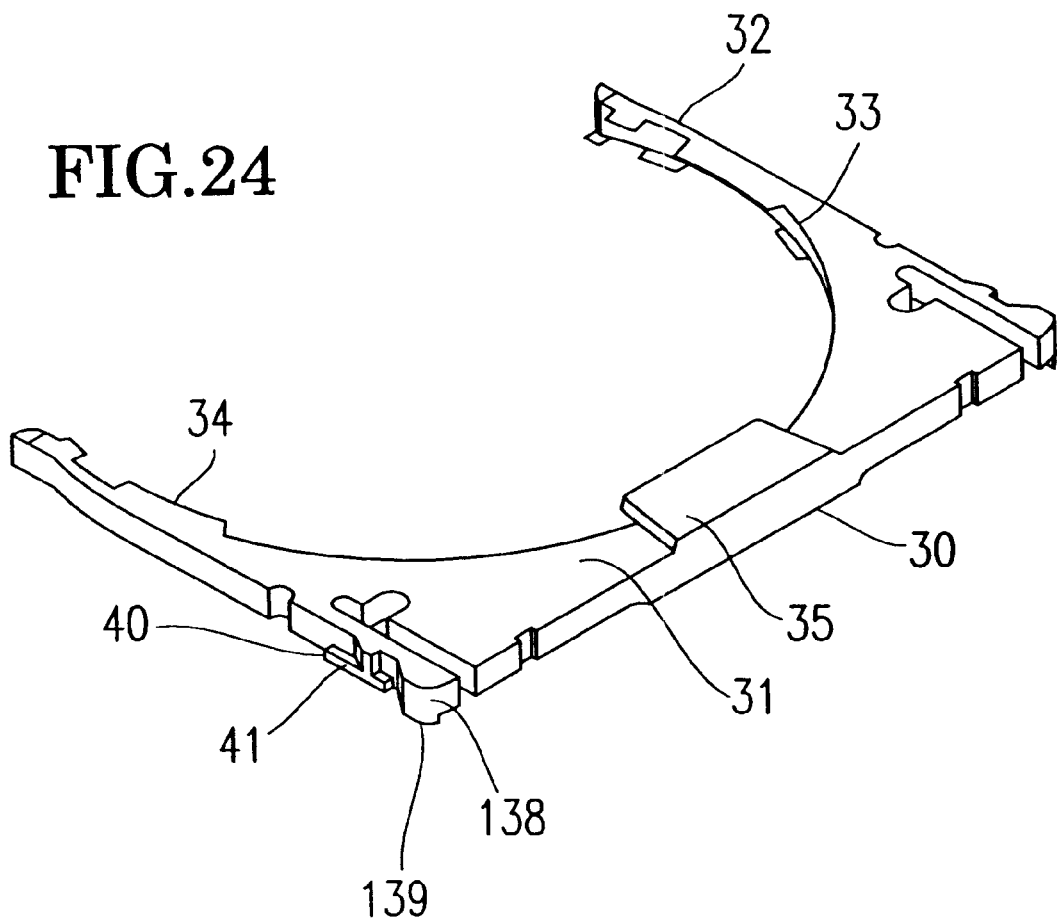
FIG. 24 is a perspective view of a disc holder of the disc cartridge of FIG. 19.

Referring to FIG. 24, the top surface of the flexible finger 40 facing the upper case 10a is flat. Therefore, it is possible to minimize the gap between the top surface of the flexible finger 40 and the bottom surface of the upper case 10a. The bottom surface of the top end (a knob 138) of the flexible finger 40 includes a flat portion and a protrusion 139 (FIG. 25) protruding downwardly from the level of the flat portion.

Figure 25:
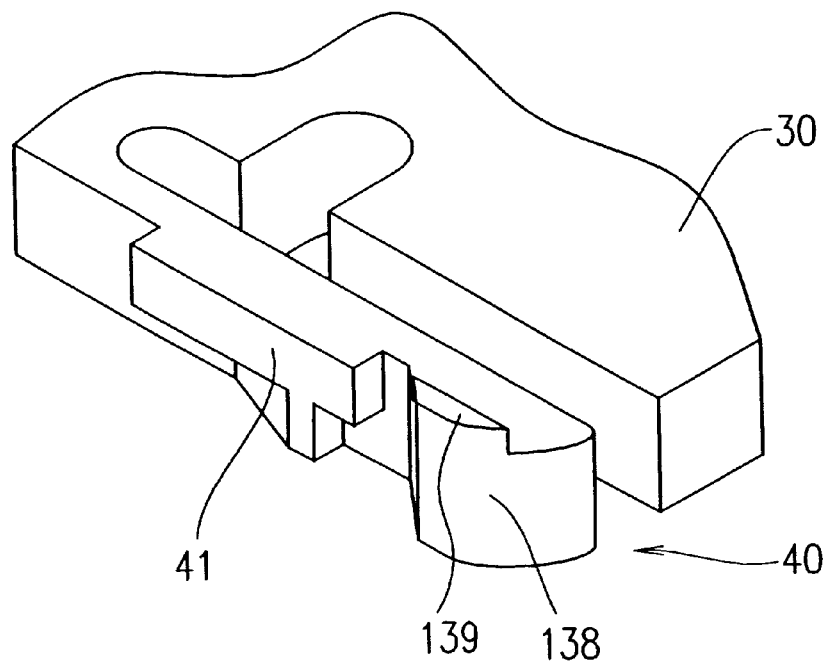
FIG. 25 an enlarged perspective view of a flexible finger of the disc holder of the disc cartridge of FIG. 19.

FIG. 25 is a perspective view illustrating the flexible finger 40 of the disc holder 30, which is turned upside down from the position shown in FIG. 24. As shown in FIG. 25, the outer side of the knob 138 is made longer by about 1.0 mm by the formation of the protrusion 139 to increase the finger touch area of the knob 138.

With the above construction, when the disc holder 30 is placed in position in the case body 10 as shown in FIG. 19 with the upper case 10a completely covering the top surfaces of the flexible fingers 40, the corners of the upper case 10a obstruct the operation of the flexible fingers 40. This reduces the possibility of accidentally deforming the flexible fingers 40. When it is attempted to remove the disc holder 30 from the case body 10 by intentionally pressing the flexible fingers 40 with fingers, access to the flexible fingers 40 is made via the corner cuts 120 of the lower case 10b, to press inwardly the flexible fingers 40 and thus release the lock. The protrusions 139 facilitate the pressing of the flexible fingers 40 with fingers. The height of each protrusion 139 is set so that the top end thereof is substantially in line with the bottom surface of the lower case 10b. The protrusion 139 should preferably not protrude from the bottom surface of the lower case 10b. If it protrudes, the insertion of the disc cartridge 200 into the recording/reproducing apparatus will become difficult.

The position and size of the protrusion 139 are preferably designed so that the protrusion 139 collides with the periphery of the corner cut 120 of the lower case 10b when the flexible finger 40 is excessively bent in the course of releasing the locking by bending the flexible finger 40. In a preferred embodiment, the gap between the flexible finger 40 and the body 31 of the disc holder 30 for allowing the flexible finger 40 to bend is as small as 1.5 to 2.0 mm. Having such a small gap, the bending of the flexible finger 40 is restricted by the side face of the body 31 of the disc holder 30. However, where the gap is designed to be larger for some reason, excessive bending of the flexible finger 40 can be restricted by the collision of the protrusion 139 with the case body 10.

Thus, by forming the protrusion 139 at the knob 138 of the flexible finger 40, various effects are obtained.

Figure 26:
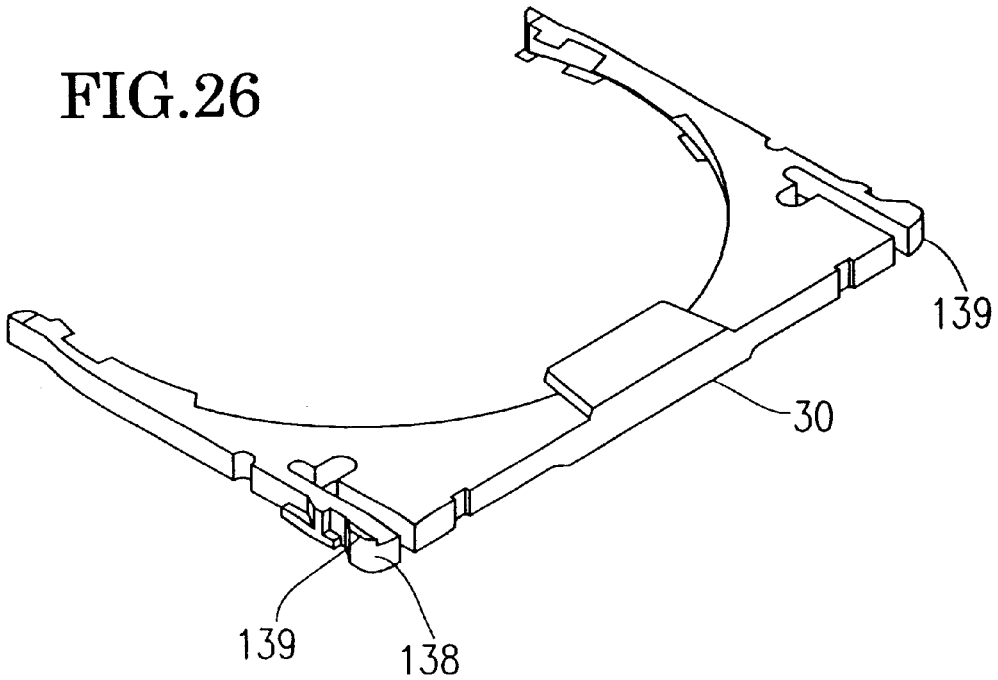
FIG. 26 is a perspective view illustrating a modification of the disc holder of FIG. 24.

Other constructions may also be adopted to prevent the flexible finger 40 from being easily touched by the user with a finger and prevent the locking of the disc holder 30 from being easily released. For example, the corner cuts 120 may be formed for the upper case 10a and the protrusions 139 may be formed to protrude upward. The two protrusions 139 may not necessarily protrude in the same direction but, as shown in FIG. 26, may protrude in the opposite directions from the disc holder 30. In the latter case, one corner cut 120 is formed at one corner of the upper case 10a and the other corner cut 120 at the opposite corner of the lower case 10b.

In this embodiment, the flexible fingers 40 are constructed so that they are not easily pressed with fingers when the user grasps both corners of the rear end portion of the case body 10 with one hand. With this construction, the locking between the disc holder 30 and the case body 10 will not be mistakenly released. In some situations, the user may grasp both corners of the rear end portion of the case body 10 in an attempt to remove the disc cartridge 200 from the disc drive. It is possible that only the disc holder 30 may be removed while the case body 10 is left behind in the disc drive. As a result, the disc 1 may be unintentionally exposed. Such an occurrence is prevented by adopting the above construction. This construction is also effective in preventing such an occurrence that the disc holder 30 unintentionally slips off from the case body 10 during the carrying of the case body 10 resulting in exposing the disc 1.

A modification of the disc cartridge 200 of the present invention will be described with reference to FIGS. 27 to 29.

Figure 27:
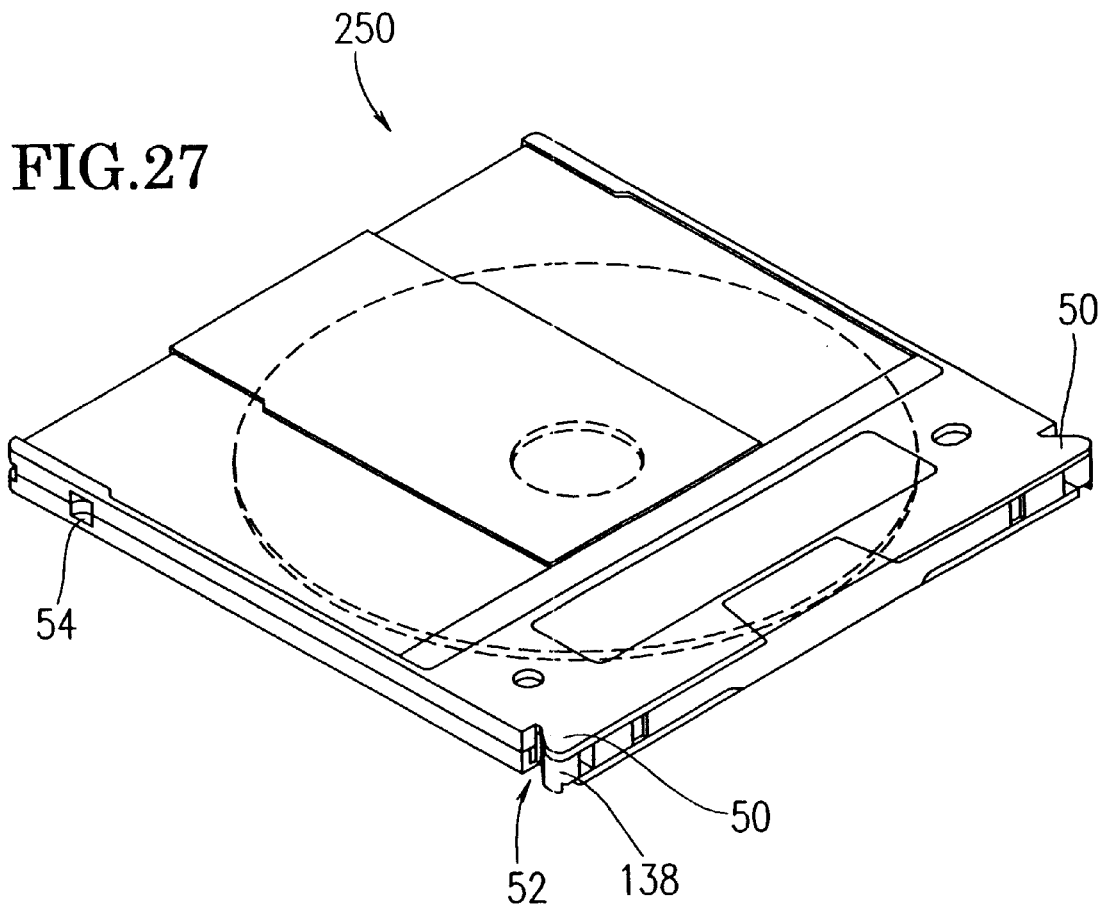
FIG. 27 is a perspective view of a disc cartridge of yet another embodiment of the present invention.
Figure 28:
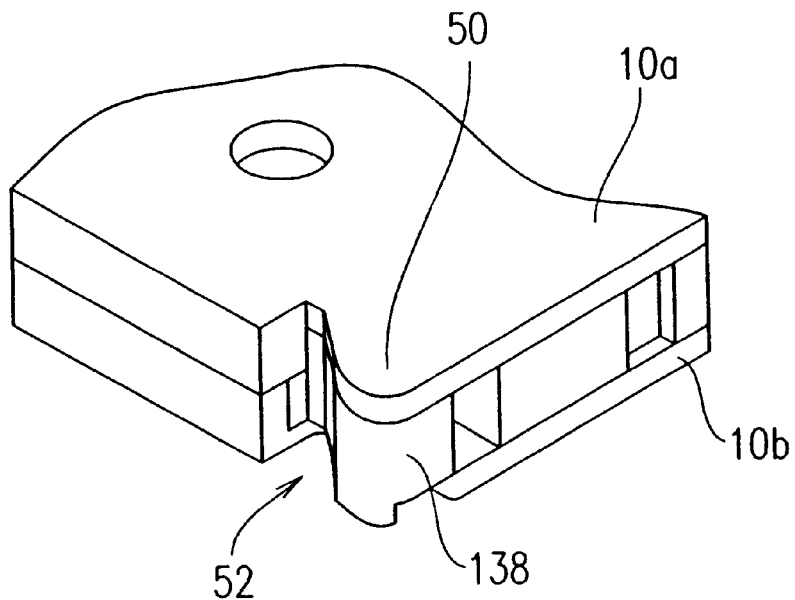
FIG. 28 is an enlarged perspective view of a corner of an upper case of the disc cartridge of FIG. 27.

A disc cartridge 250 shown in FIG. 27 is different from the disc cartridge 200 in the shape of the corners of the rear end portion of the upper case 10a. FIG. 28 is an enlarged perspective view of one corner of the rear end portion of the upper case 10a, and FIG. 29 is an enlarged perspective view of one corner of the rear end portion of the lower case 10b. As is apparent from these figures, the upper case 10a of the disc cartridge 250 includes a portion 50 having an outline corresponding to that of the knob 138 of the flexible finger 40. The knob 138 of the flexible finger 40 is wider than the remaining portion thereof and has a curved outer side face so as to be easily pressed by a fingertip.

Figure 29:
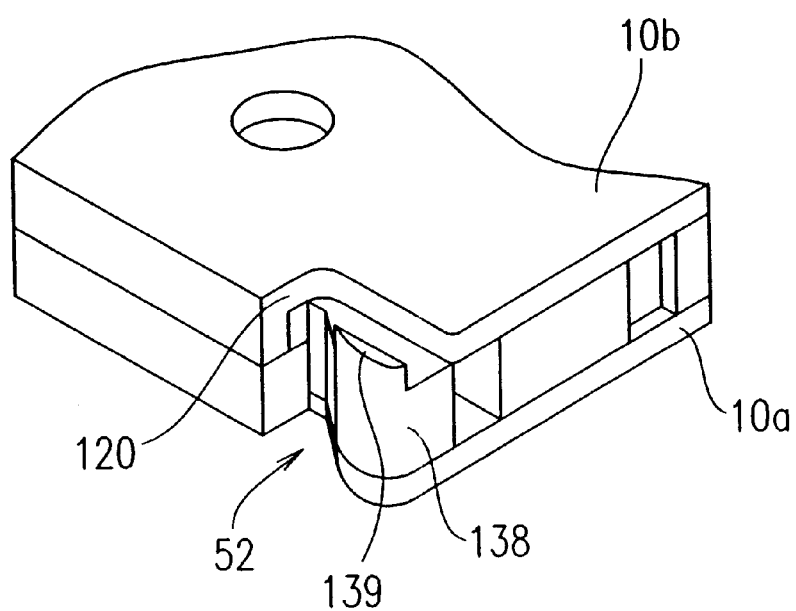
FIG. 29 is an enlarged perspective view of a corner of a lower case of the disc cartridge of FIG. 27.

The lower case 10b of the disc cartridge 250 includes the corner cut 120 at each corner as shown in FIG. 29. The upper case 10a has the portion 50 that completely covers the top surface of the knob 138 of the flexible finger 40 and has an outline corresponding to that of the knob 138 as described above. Accordingly, a small cut is formed on each side face of the upper case 10a. As a result, when the disc holder 30 is placed in position in the case body 10, a concave portion 52 functioning as a slot extending in the thickness direction is formed on each side face of the disc cartridge 250. This slot 52 is located comparatively closer to the rear end portion of the case body 10. The slot 52 therefore plays an important role as follows when the case body 10 is to be inserted into the recording/reproducing apparatus.

When the case body 10 is to be inserted into the recording/reproducing apparatus with the front end portion entering first, an auto-loading mechanism of the recording/reproducing apparatus catches a concave portion 54 located near the front end portion of the case body 10 for executing auto-loading operation required. If the case body 10 is wrongly inserted into the recording/reproducing apparatus with the rear end portion entering first, the auto-loading mechanism detects the slot 52 located near the rear end portion of the case body 10 and operates to block further insertion of the case body 10.

In this embodiment, in place of forming a special slot for mis-insertion protection, the portion serving as the slot is provided by utilizing the corner cut 120 of the lower case 10b and the small cut formed on the upper case 10a.

Although not shown for simplification, in the disc cartridges 200 and 250, the stop lugs 19 are formed on the case body 10 and the corresponding stop recesses 37 are formed on the disc holder 30. A disc cartridge having all the features provided by the disc cartridges 100, 200, and 250 described above may be most preferable.

Thus, in the disc cartridge of the present invention, the grip is formed in the center of the disc holder. This improves the insertion/removal operability of the disc holder into/from the case body and also reduces the possibility of a touch of a finger on the disc surface. The formation of the grip improves the rigidity of the disc holder body, and thus the size of the center portion of the disc holder body can be reduced. This contributes to the size reduction of the case body.

The grip firmly engages with the case body. This prevents the disc holder from entering the case body too deeply thereby causing the case body overlapping with the grip.

In another disc cartridge of the present invention, the disc holder is prevented from being inserted into the case body upside down.

In yet another disc cartridge of the present invention, the corners of the rear end portion of the case body are constructed so that the flexible fingers are not easily pressed when the user grasps both corners of the rear end portion of the case body. This prevents an occurrence of mistakenly releasing the locking between the disc holder and the case body. As a result, the disc holder is protected from being unintentionally removed from the case body resulting in exposure of the disc.

According to the present invention, the arms of the disc holder are not elastically deformed during the period for which the disc holder is mounted in the case body. Therefore, the stress relaxation of the arms does not proceed with time even when the disc holder is kept mounted in the case body. This allows the arms to be formed integrally with the disc holder body with a material such as a polymeric material, and thus reduces the cost of the disc holder.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A disc cartridge comprising:

a disc holder for supporting a disc-shaped recording medium, the disc holder including a grip having an upper portion and a lower portion, and a disc receptacle portion, the grip being thicker than the disc receptacle portion; and a case defining a housing portion for receiving the disc holder and the recording medium, the case including an upper portion, a lower portion, and side portions surrounding the housing portion, the case allowing the disc holder with the recording medium to be inserted into and removed from the housing portion via an opening formed through one of the side portions, the upper and lower portions of the case each including a cut for exposing the upper portion and the lower portion of the grip respectively when the disc holder is in the case, wherein one of the grip and the cut of the case has a plurality of spaced apart lugs while the other of the grip and the cut of the case has a plurality of spaced apart recesses for receiving the lugs at positions corresponding to the lugs, to thereby engage the respective lugs wherein each of the upper portion and the lower portion of the grip has side portions tapering from a bottom end to a top end of the grip, the top end of the grip having a smaller width than the bottom end of the grip, the cut of the upper portion of the case and the cut of the lower portion of the case being shaped to correspond with the taper of the side portions of the grip thereby facilitating smooth engagement of the grip and the cuts.

2. A disc cartridge according to claim 1, wherein the upper portion of the grip of the disc holder is different in shape from the lower portion of the grip.

3. A disc cartridge according to claim 2, wherein the upper portion of the grip of the disc holder is in line with the upper portion of the case, and the lower portion of the grip is in line with the lower portion of the case.

4. A disc cartridge according to claim 2, wherein the difference in shape between the upper portion and the lower portion of the grip is visually recognizable.

5. A disc cartridge according to claim 1, wherein the disc holder includes: a body that blocks the opening of the case when the disc holder is inserted into the case; and two arms extending from the body, and the grip is formed on the body of the disc holder.

6. A disc cartridge according to claim 5, wherein the shapes of the upper portion and the lower portion of the grip are such that interference between the grip and the cuts of the case can be minimized when the disc holder is inserted into the case.

7. A disc cartridge according to claim 5, wherein disc supports are formed on the arms of the disc holder for restricting the movement of the recording medium in a direction vertical to top and bottom surfaces of the recording medium.

8. A disc cartridge according to claim 5, wherein guide pieces are formed at top ends of the arms of the disc holder for guiding the recording medium together with disc supports formed at positions closest to the top ends, and the guide pieces restrict the movement of the recording medium in a direction vertical to top and bottom surfaces of the recording medium, and facilitate insertion of the recording medium in the disc holder.

9. A disc cartridge according to claim 1, wherein the grip of the disc holder has faces partly facing a top surface and a bottom surface of the recording medium.

10. A disc cartridge according to claim 1, wherein the grip includes identification means for distinguishing a top surface and a bottom surface of the disc holder from each other.

11. A disc cartridge according to claim 10, wherein the identification means has a shape recognizable by a touch of a finger.

12. A disc cartridge according to claim 1, wherein a contacting surface between each lug and each recess is beveled to facilitate a smooth engagement of each of the lugs and the corresponding recesses, the engagement of the lugs with the recesses preventing the upper and the lower portions of the case from deforming outwardly when the disc holder is inserted into the case.

* * * * *